United States Patent [19]
Labell

[11] Patent Number: 6,042,321
[45] Date of Patent: Mar. 28, 2000

[54] AUTOMATED STORAGE AND RETRIEVAL SYSTEM FOR PALLETLESS DAIRY CASES

[75] Inventor: Daniel Labell, New Cumberland, Pa.

[73] Assignee: Westafalia Technologies, Inc., York, Pa.

[21] Appl. No.: 09/058,220

[22] Filed: Apr. 10, 1998

Related U.S. Application Data

[63] Continuation-in-part of application No. 08/689,099, Jul. 30, 1996, abandoned.

[51] Int. Cl.[7] .................................................... B65G 1/04
[52] U.S. Cl. ........................ 414/276; 414/279; 414/284; 414/286
[58] Field of Search .................................. 414/276, 277, 414/279, 281, 284, 286; 198/495; 211/162, 191

[56] References Cited

U.S. PATENT DOCUMENTS

| | | |
|---|---|---|
| 3,817,406 | 6/1974 | Sawada et al. . |
| 3,924,300 | 12/1975 | Hilger et al. . |
| 4,119,208 | 10/1978 | Acker ................................... 211/162 X |
| 4,252,217 | 2/1981 | Benjamin . |
| 4,395,181 | 7/1983 | Loomer . |
| 4,459,078 | 7/1984 | Chiantella et al. . |
| 4,462,500 | 7/1984 | Konstant et al. .................... 414/276 X |
| 4,971,507 | 11/1990 | Weggelaar . |
| 4,988,251 | 1/1991 | Kinney ..................................... 414/276 |
| 5,149,240 | 9/1992 | Di Rosa .................................. 414/277 |
| 5,333,982 | 8/1994 | Tanizawa et al. . |
| 5,379,229 | 1/1995 | Parsons et al. . |
| 5,605,427 | 2/1997 | Hammond ............................... 414/276 |
| 5,655,675 | 8/1997 | Clark et al. .......................... 211/191 X |
| 5,707,199 | 1/1998 | Faller .................................. 414/286 X |
| 5,810,153 | 9/1998 | Zimmerman et al. .................. 198/495 |

FOREIGN PATENT DOCUMENTS

| | | |
|---|---|---|
| 31773 | 3/1980 | Japan ..................................... 414/286 |
| 2256428 | 12/1992 | United Kingdom ................... 211/162 |
| 9523730 | 9/1995 | WIPO . |

*Primary Examiner*—James W. Keenan
*Attorney, Agent, or Firm*—Sixbey, Friedman, Leedom & Ferguson P.C.; Charles M. Leedom Jr.

[57] ABSTRACT

An automated storage system for receiving, storing and returning dairy cases stored without pallets. Specifically, the automated storage system comprises an article transporter which includes a shuttle that deposits and retrieves dairy cases stored in storage lanes of a storage rack and a rail system for supporting the shuttle and dairy cases stored thereon. One or more shuttles may be used in the automated storage and retrieval system and are coupled via a shuttle bridge. The rail system includes two or more outer support rails and two or more inner support rails for supporting the shuttle and dairy cases. The rail system also supports normal Grocery Manufacturers Association (GMA) pallets or other special slave pallets. The bottom flange of the rail system has a "drip pan" style to contain leakage from the dairy cases. This "drip pan" design allows personnel to walk inside the storage lanes safely. The automated storage system also includes top guide rails and side guide rails mounted on the rigid framework of the automated storage system which prevent stacked dairy cases from tilting, tipping or misaligning when the dairy cases are stored within and transported through the storage lane. The automated system further includes predetermined gravity-feed storage lanes with roller conveyors which include two outer roller rails and one inner roller rail positioned so as to receive and support the stacked goods at the same position as the outer support rails and the inner support rails. The two outer roller rails also include tilt-in rollers which further prevents misalignment of the goods as they are transported on the roller conveyors through the gravity-feed storage lane.

53 Claims, 14 Drawing Sheets

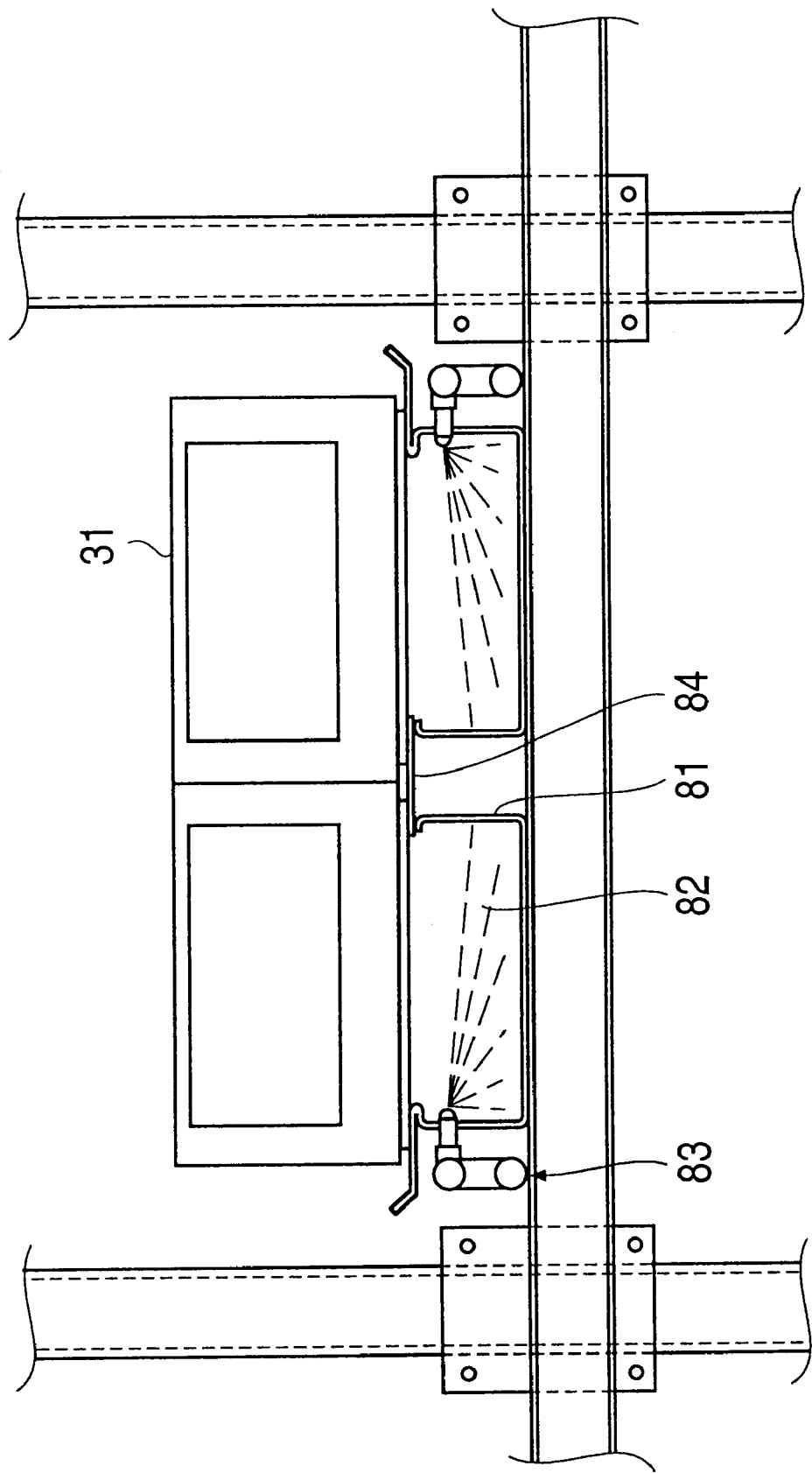

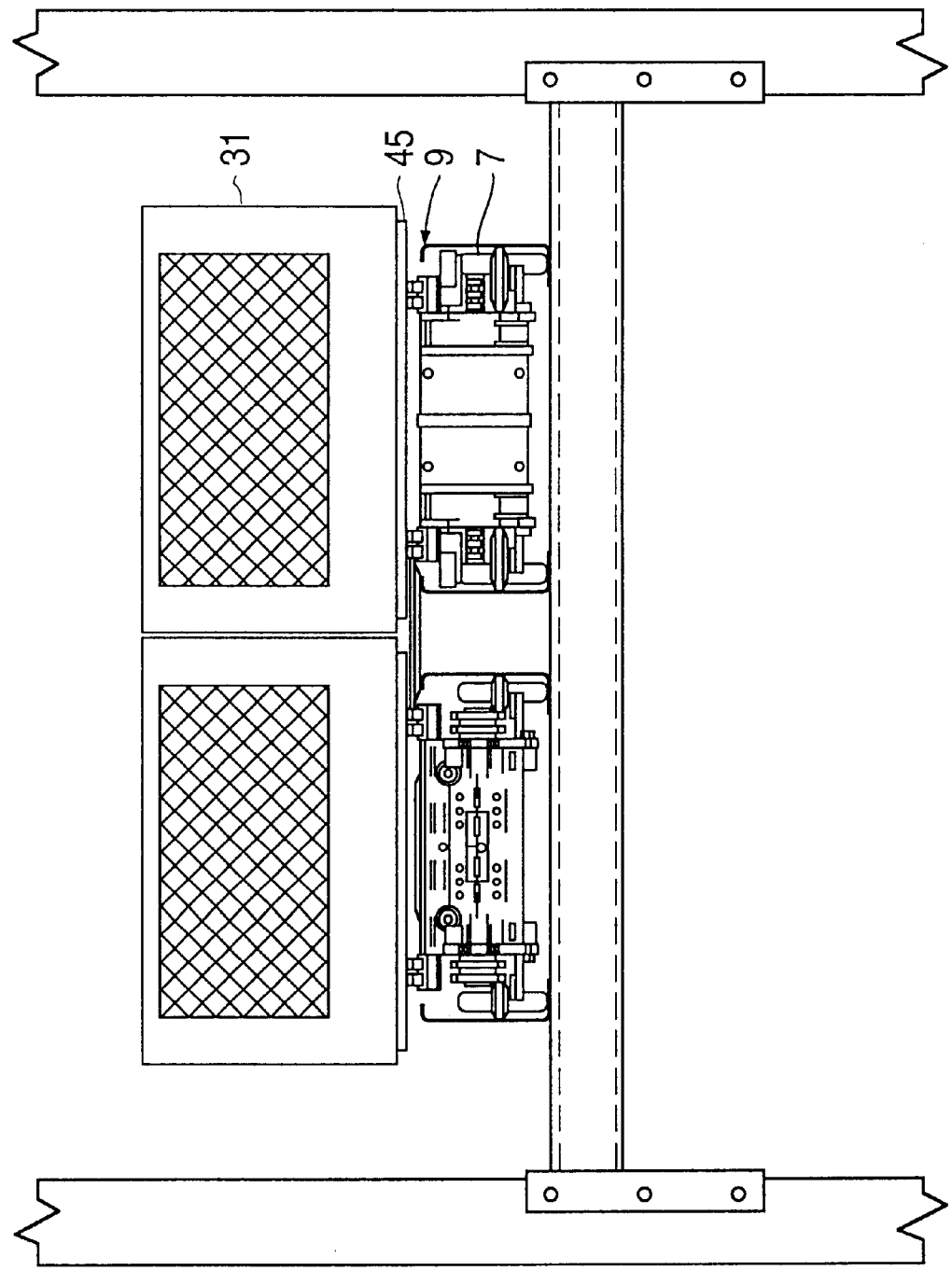

AUTOMATED STORAGE AND RETRIEVAL SYSTEM FOR PALLETLESS DAIRY CASES

CROSS REFERENCE TO OTHER APPLICATIONS

This is a continuation-in-part of U.S. application Ser. No. 08/689,099, filed Jul. 30, 1996.

TECHNICAL FIELD

This invention is generally directed to the field of automated storage systems and more particularly to an automated system for receiving, storing and returning palletless dairy cases from storage racks.

BACKGROUND

Warehouse storage of goods and articles has been known for many years. Due to the large amounts of goods that can be stored inside of a warehouse, attempts have been made to create various systems and methods to track warehouse inventory and effectively retrieve particular goods from the warehouse to satisfy customer orders or fulfill other needs such as storage and retrieval of goods in a cargo vessel. Traditionally, manpower was used to store goods in a warehouse type, multi-level system of racks and to locate and retrieve specific items stored therein.

The warehousing of goods soon became more sophisticated, in that, goods were being stored in multi-level racks that stretched beyond the reach of persons standing on the ground level. With this new storing scheme, elevating equipment, such as, forklifts were needed to elevate the manpower to the desired level of the warehouse rack to store or retrieve the goods needed, for example, to fill the orders of awaiting customers. The problem with this traditional warehouse operation is that many personnel were needed to operate warehouses having high storage capacities. In addition, human error resulted in goods being stored in and retrieved from the wrong location in the warehouse which could be costly for a company to correct. Warehouse designers attempted to use elevators to overcome the problem of storing and retrieving multi-level stacks of goods, however, certain problems still limited warehouse production and operation. These include the limited amount of weight that one person could lift.

The industry has recognized that, in order to increase warehouse production and efficiency, an improved retrieval and storage system would be necessary to reduce the human element. By using robots and other machines to reduce the amount of manual labor required, a higher volume of goods could be stored or retrieved in less time and/or with less cost.

One attempt to automate storage and retrieval for warehouse applications is disclosed in U.S. Pat. No. 4,971,507 to Wegglaar which discloses a storage system wherein a carriage extendable from a fork-lift truck moves within rails provided in a multi-tiered rack to deposit or retrieve palletized goods. The carriage is able to access each level of the multi-tiered rack using a vertically extending mast on the fork-lift truck. Due to the limited extension of the mast, however, the height of the storage rack must be restricted. In addition, the system requires a person to control and operate the fork-lift truck and carriage.

A further means of automating warehouse storage and retrieval is found in U.S. Pat. No. 3,924,300 to Hilger et al. which discloses a shuttle car used to transfer an article from one station to another by a mechanism which has a vertically movable bed portion and may be elevated to pick-up an article or load and lowered to deposit the same article or load.

Other automated storage and retrieval systems used in warehouse environments include U.S. Pat. No. 5,333,982 to Tanizawa which teaches a plurality of electrically driven cargo carriers that run on multi-level routes disposed one over another between two rows of opposing assemblies of cargo storage shelves and U.S. Pat. No. 4,395,181 to Loomer which discloses an automated storage system comprising a vehicle for transporting loaded pallets within a plurality of tracks that form a storage rack. The disclosed vehicle in Loomer comprises extendable lift mechanisms for elevating pallets above the level of the tracks during vehicle traversal and for lowering the pallets onto support surfaces formed on the tracks for storage.

The problem with the automated systems disclosed in Loomer, Tanizawa et al. and Hilger et al. is that each system uses a separate cargo carrier or shuttle for each level of a storage rack resulting in a large number of required shuttles for effective operation. Due to their complexity, these types of systems are costly to manufacture, operate and maintain. In addition, if one or more of the cars employed in the above systems breaks down, the warehouse operator would have to manually access the goods serviced by that vehicle.

An improvement on the above automated systems is found in U.S. Pat. No. 5,379,229 to Parsons et al. which discloses an automated storage and retrieval system having a single storage transport able to access different tiers of a multi-tiered storage rack to deposit or retrieve objects stored therein. The system, however, is limited to depositing and retrieving small objects and does not include the type of supports required for manipulating large cases of goods or articles normally stored on a pallet.

U.S. Pat. No. 3,817,406 to Sawada et al., U.S. Pat. No. 4,252,217 to Benjamin, and U.S. Pat. No. 4,459,078 to Chiantella et al. disclose automated warehousing systems that employ a crane device in combination with a movable shuttle that is able to access each level of a storage rack. The designs of these automated warehousing systems do not require the amount of manpower necessary to operate effectively the Wegglaar system discussed above. Benjamin, however, does require an operator to control the disclosed crane device. Moreover, all of the above-noted systems appear to be limited in the amount of goods that can be transported in a single "run."

In view of the above devices and their limitations, there remains a need for an automated storage and retrieval system that is not restricted to one movable shuttle per tier and is capable of transporting a large amount of goods from a single tier. To facilitate the ability to transport large loads, there is a further need for a rail system that can accommodate multiple shuttles and can be used as a "drip pan" to collect any leakage from the goods stored on the multi-tiered storage rack.

A system design that improves upon the references cited above is provided in International Application No. PCT/EP95/00738 filed on Mar. 1, 1995 to Upmeyer which shows a pallet shelf system having multiple tiers and comprising supporting and running guides for supporting pallets thereon and a pallet transporting car movable within the supporting and running guides for depositing and retrieving palletized goods. In an alternative embodiment of Upmeyer, the supporting and running guides form a running tub to provide air circulation to the palletized goods, such as perishable fruit. Two pallet transporting cars may be coupled together in the Upmeyer system for movement within two adjacent channels formed by a pair of touching inner support rails for supporting a single pallet and for forming the inner guides for the coupled pallet transporting cars.

Although the Upmeyer system improves upon the systems discussed above, the inventor of the present invention has identified a need in the industry for an automated storage system that is able to receive, store and retrieve high volumes of goods efficiently without the need for pallets. Pallets are cumbersome and take up space within the warehouse that can otherwise be used effectively. For example, when articles are completely removed or "picked" from a pallet, the pallet must be manually moved to a designated return lane for later usage. The time needed to manipulate pallets decreases the efficiency of warehouse operation. Furthermore, pallets add to system installation costs and pallets may break and require replacement which adds still further to the cost of maintaining warehouse operation. In addition, there is a need for a support rail design that acts as a "drip pan" to collect leakage from stored goods such as dairy cases. There is also a need for an automated storage system wherein multiple shuttles may be used to facilitate transporting loads of varying sizes whether palletized or not. Furthermore, there is a need for an automated storage system that is able to receive, store and retrieve stackable goods such as dairy cases in a cost effective, efficient and reliable manner. To this end, there is also a need for such an automated storage system that prevents stacked goods such as dairy cases, from tilting, tipping or misaligning when the stacked goods are stored within and transported through a storage lane.

SUMMARY OF THE INVENTION

It is an object of the present invention to provide an improved automated storage system that receives, stores and returns articles without requiring the use of pallets.

It is also an object of the present invention to provide an improved automated storage system for use in a warehouse environment that eliminates the need to manually manipulate pallets upon removing articles stored thereon.

It is a further object of the present invention to provide an improved, compact automated storage system having a support rail design that is able to support articles, such as dairy products, in storage without requiring the use of pallets.

It is again an object of the present invention to provide an automated storage system that achieves one or more of the above objects and also provides a rail design that collects leakage from articles, such as dairy products, supported thereon.

It is also an object of the present invention to provide an improved automated storage system that achieves one or more of the above objects and also provides a support rail design that is able to guide a shuttle movable within the support rail design for receiving, storing and retrieving cases of goods supported thereon.

It is another object of the present invention to provide an improved automated storage system having a palletless support rail design and including multiple transporting shuttles connected together to retrieve or deposit loads of varying sizes within the automated storage system.

It is further another object of the present invention to provide an improved automated storage system that achieves one or more of the above objects and also provides an article transporter for vertically and horizontally moving the multiple transporting shuttles between different levels and sections of a storage rack to facilitate palletless article storage.

It is another object of the present invention to provide an improved automated storage system that includes guide rails which prevent stacked goods such as dairy cases, from tilting, tipping or misaligning when the stacked goods are stored within and transported through a storage lane.

It is further another object of the present invention to provide an improved automated storage system that includes roller conveyors in a gravity-feed storage lane which prevents further misalignment of the goods as they are transported on the gravity conveyors through the storage lane.

A still more specific object of the subject invention is to provide a compact automated storage system having multiple storage lanes and including a set of support rails located within each storage lane, wherein the set includes a pair of outer support rails for providing vertical support to articles located in stored positions within the storage lane and at least one pair of inner support rails for providing additional vertical support to the stored articles, and wherein the pair of inner support rails are spaced, respectively, from the outer support rails by a distance sufficient to allow a transported shuttle to pass therebetween when transporting an article along the storage lane, and wherein inner support rails are spaced apart by a substantial horizontal distance to provide distributed support to articles stored directly on the rails, whereby the storage system can provide undergirding support that is adequately distributed to accommodate palletless articles. In addition, another specific object of the present invention is to provide an automated storage system further including side guide rails and top guide rails which prevent stacked goods, such as dairy cases, from tilting and tipping when the stacked goods are stored within and transported through a storage lane and also includes roller conveyors with tilt-in rollers in a gravity-feed storage lane that prevents misalignment of the goods as they are transported on the roller conveyors through the gravity-feed storage lane.

These and other objects are achieved by a compact automated storage system for receiving, storing and returning palletless articles comprising a storage rack having a rigid support framework containing a plurality of open ended storage lanes having a cross sectional extent sufficient to allow the palletless articles to be conveyed into and out of the storage lanes. The open ends of the storage lanes are generally positioned adjacent a shelving pathway extending along the storage rack. An article transporter is movable within the shelving pathway between loading/unloading stations in which the article transporter is alignable with corresponding open ends of the storage lanes. Moreover, the article transporter includes at least one shuttle for moving an article along a storage lane when the article transporter is aligned with the open end of the storage lane and for moving an article into and out of a stored position within the storage lane. The automated storage system further includes a plurality of support rail sets mounted on the support framework, respectively, within the plurality of open ended storage lanes, each support rail set including a pair of outer support rails for providing vertical support to articles located in stored positions within the corresponding storage lane and at least one pair of inner support rails for providing additional vertical support to the articles. The pair of inner support rails are spaced, respectively, from the outer support rails by a distance sufficient to allow the shuttle to pass therebetween when transporting an article along the storage lane. The inner support rails are spaced apart by a substantial horizontal distance to provide distributed support to articles stored directly on the rails, whereby the storage system can provide undergirding support that is adequately distributed to accommodate palletless articles. The support rails also allows palleted articles to be triple supported to limit the deflection of the pallets and thus, increase their useful life.

In addition, the automated storage system further includes at least one bridge which connects at least two of the inner support rails and provides a support platform for supporting palletless articles stored thereon. A shuttle bridge may further be provided to connect two or more shuttles together for travelling along respective storage lanes. The shuttle bridge provides an electrical connection between the shuttles travelling within respective storage lane to provide power and other special control features.

The outer support rails and inner support rails of the support rail set are spaced apart in a manner that facilitates the storage of at least two twenty-four quart dairy cases stored side-by-side on the support rail supported without an undergirding pallet; two sixteen quart cases stored side-by-side on the support rail with or without an undergirding pallet; and articles supported by a pallet conforming with the standards of the Grocery Manufacturers Association (GMA).

Furthermore, the automated storage system also includes top guide rails and side guide rails mounted on the rigid framework of the automated storage system which prevent stacked goods, such as dairy cases, from tilting, tipping or misaligning when the stacked goods are stored within and transported through a storage lane. The automated system further includes predetermined gravity-feed storage lanes with roller conveyors that use the force of gravity to transport the stacked goods from a storage lane entrance to a storage lane exit which has a lower elevation than the storage lane entrance. The roller conveyors include two outer roller rails and one inner roller rail which are positioned to receive and support the stacked goods at the same position as the outer support rails and the inner support rails noted previously thereby facilitating the storage and transport of at least two twenty-four quart dairy cases stored side-by-side or two sixteen quart cases stored side-by-side with or without an undergirding pallet. The two outer roller rails further include tilt-in rollers which further prevents misalignment of the goods as they are transported on the roller conveyors through the gravity-feed storage lane.

In an alternative embodiment, the automated storage system may include support rail sets comprising at least two troughs formed from galvanized steel in which one or more shuttles are movable. The support rail sets have lip portions at their side edges for guiding the dairy cases as they are moved within the storage lanes and for supporting palletless articles. This embodiment of the present invention further includes a sprinkler system positioned adjacent to the outer support rails for spraying down the trough. The sprinkler system includes a washdown pipe and nozzle which are activated to removes leakage from the palletless articles that seep onto the troughs. The leakage is forced towards a drip pan outlet which guides the leakage to a designated area for removal. In addition, a bridge support is provided to further support palletless articles stored thereon.

In operation, the automated storage system retrieves and deposits an article using the multiple shuttles which move along the support rails until they locate a load to be moved. At this time, the multiple shuttles activate a chain conveyor included on the shuttles for engaging the article to be moved and conveys or removes the article from the shuttle bed. The multiple shuttles then move within the rail system toward or away from the article transporter, depending on the desired function. Once the article is on the article transporter it is carried to a designated location in the warehouse and unloaded from the transporter. As the article is being transported, the side guide rails and the top guide rails prevent the articles from tilting and tipping in the storage lane. The article can be unloaded into a gravity-feed storage lane with a roller conveyor which uses the force of gravity to transport the article from the storage lane entrance to a storage lane exit. Again, the side guide rails and the top guide rails prevent the articles from tilting, tipping or misaligning. In addition, the roller conveyor includes two outer roller rails with tilt-in rollers which prevent misalignment of the articles in the storage lane as they are transported.

BRIEF DESCRIPTION OF THE DRAWINGS

FIG. 6a shows a front elevational view of supporting guide rails forming a trough and having a sprinkler system for cleaning the trough periodically in accordance with an alternative embodiment of the present invention;

FIG. 7 shows a front elevational view of the support rail system in a warehouse environment with dairy cases stacked thereon and two shuttles coupled together in accordance with one embodiment of the present invention;

DETAILED DESCRIPTION OF THE PREFERRED EMBODIMENT

Figure 1:
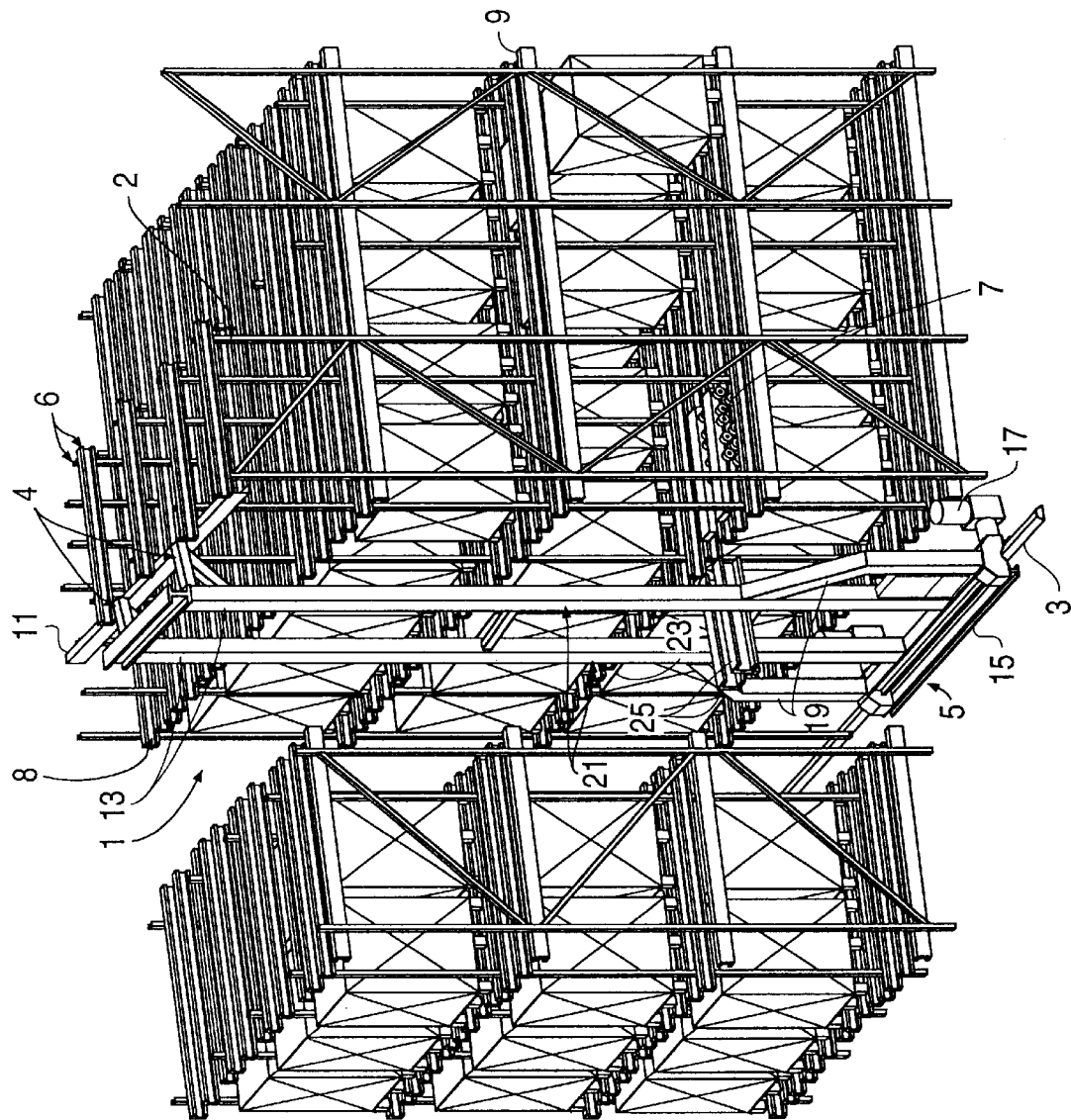
FIG. 1 shows a perspective view of the present invention used in a warehouse environment in accordance with one embodiment.

FIG. 1 illustrates one embodiment of the present invention which includes an automated storage and retrieval system 1 that is suitable for storing and retrieving articles, such as in a warehouse or other environments. While FIG. 1 illustrates a warehouse environment having palletized goods, the invention has particular utility when used to store and retrieve articles, such as dairy cases, or other types of cases that are palletless. The embodiment illustrating dairy case storage is discussed in further detail with regard to FIGS. 2, 3a–c, 5a–c, and 7. One skilled in the art should recognize, however, that the present invention may be used in any environment where automated storage and retrieval is desired for goods stored with or without pallets. In FIG. 1, automated storage system 1 is shown to include a storage rack formed from a rigid framework containing a stacked array of generally aligned storage lanes within which articles may be received, stored and retrieved. The storage system further includes an article transporter 5, and a pair of shuttles 7, carried by the transporter 5 to an appropriate storage lane where the shuttles are adapted to deposit and retrieve articles. Within each storage lane are a set of support rails 9 upon which the articles are vertically supported during storage. As will be explained more thoroughly below, the arrangement of these support rails serves the crucial function of guiding shuttle 7 and providing distributed undergirding support to the stored articles in a way that permits the elimination of the need to use pallets in certain circumstances. When pallets are used, the support rails provide triple support to limit the deflection of the pallets and thus, increase their useful life.

The transporting shuttles are guided by support rails 9 to travel beneath the stored articles and to lift the articles out of contact with the support rails so that they may be carried to and from the transporter 5. The pair of shuttles are substantially spaced apart within at least some of the storage lanes of the storage racks. This arrangement is an important feature of the subject invention because it allows palletless articles, such as, dairy cases, to be stored side-by-side in an extremely compact and cost effective manner. The arrangement also promotes storage and retrieval of such palletless articles by allowing the support rails to provide distributed support for the stored articles laterally across the lower surface of the palletless articles.

More specifically, automated storage system 1 utilizes a storage rack 2 having a rigid support framework 6 containing a plurality of open ended storage lanes 8 which facilitate the conveyance of palletless articles therein and therefrom. The open ends of the storage lanes 8 are generally positioned adjacent a shelving pathway extending along the storage rack 2.

Article transporter 5 is movable along a track 3 for guiding article transporter 5 along the shelving pathway extending between storage racks 2, as shown in FIG. 1, and is further guided by an uppermost rail 11 on which article transporter 5 is movably attached by rollers 4 which engage rail 11 to align itself with the corresponding open ends of the storage lanes 8 for depositing and retrieving stored goods. Article transporter 5 includes two vertically extending masts 13 which rigidly attach to a lower base member 15 that is parallel to guide rail 3. Lower base member 15 directly engages and is propelled along rail guide 3 via motors 17 which are mounted to the lower base member and arranged to propel transporter 5 horizontally in either direction by being rotationally linked to a support roller, not illustrated, which engages track 3. Additional support for article transporter 5 is provided by guide support bars 19 which help to secure masts 13 onto lower base member 15. The masts of the article transporter form a unitary, rigid structure, preferably formed from metal but is sufficiently lightweight to allow easy mobility along the storage racks.

An elevator structure 21 is positioned between and movably supported by masts 13 for movement among vertically spaced loading and unloading stations generally aligned with the open ends of the various storage lanes 8. The elevator structure includes a rectangular frame 23 and multiple arms 25 which support a pair of shuttles 7 discussed in still more detail below. Elevator structure 21 extends vertically to each tier of storage racks 2. Since this entire system is automated through computerized control, article transporter 5 is able to locate a stack of dairy cases or a pallet that has been identified and recorded into an external computer system (not shown). Article transporter 5 is guided by commands generated by the external computer system to the appropriate storage lane for depositing or retrieving an identified stack of dairy cases stored in a lane. A multitude of article transporters may be used simultaneously in a warehouse environment to facilitate a large or small amount of storage and retrieval as desired by the warehouse operator.

Shuttle 7, described more thoroughly below, provides a means for placing and retrieving articles within each storage lane. In particular, shuttle 7 is carried on horizontally extending arms 25 of the article transporter 5 while article transporter 5 is locating the desired storage lane 8 in storage rack 2. Once the article transporter 5 has reached the loading/unloading station aligned with the open end of the desired storage lane, shuttle 7 is activated and rolls towards the identified dairy cases for retrieval. Upon retrieving the stacked dairy cases, shuttle 7 returns back to arms 25 where the dairy cases are transported on article transporter 5 to a designated location in the warehouse for removal.

Figure 2:
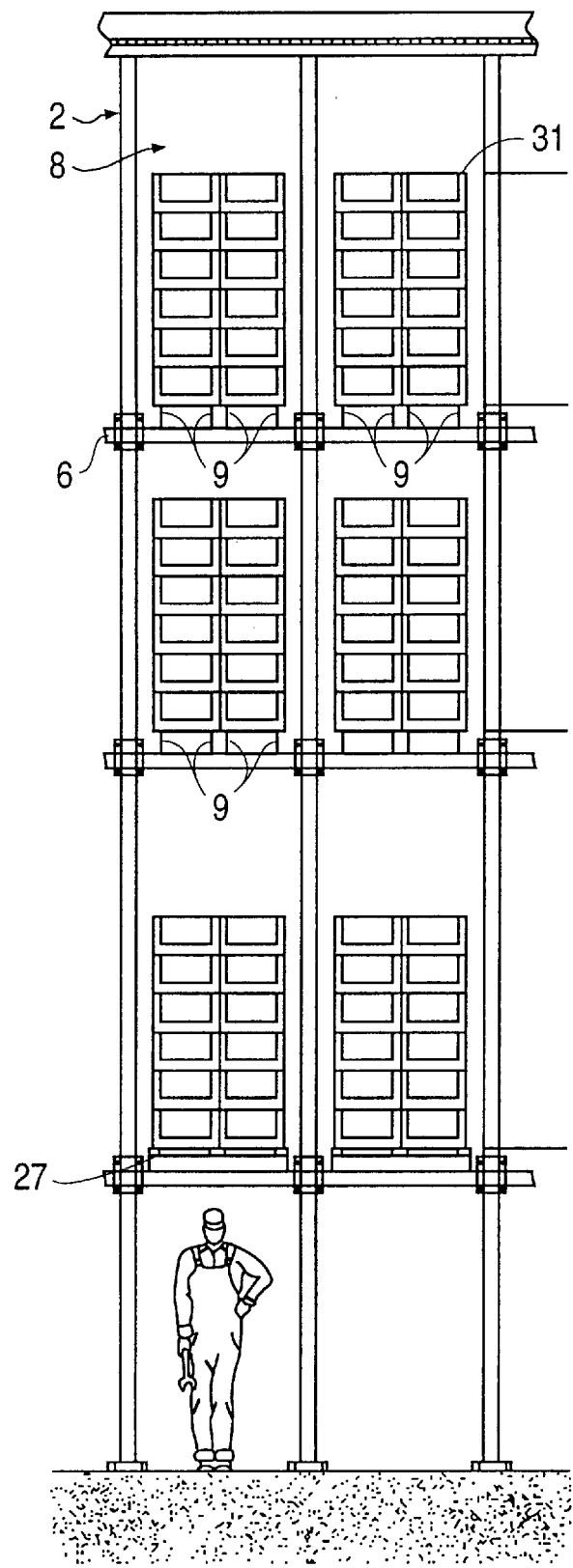
FIG. 2 shows a front elevational view of the warehouse storage racks and rail design used for supporting stacked goods in accordance with one embodiment of the present invention.

FIG. 2 shows a front plan view of the set of support rails 9, associated with each storage lane, which are shown supporting stacked articles, in particular, dairy cases 31. As can be seen from FIG. 2, storage rack 2 includes four tiers, however, it may have more or less tiers depending on the amount of storage space desired. Dairy cases 31 are shown as stored in storage lanes 8 of the top three tiers of this rack structure and are sectioned accordingly. Each tier is sectioned so that one set of stacked dairy cases 31 and one or more sets of support rails 9 are provided in each section. In this embodiment, an operator or worker is able to safely work on the ground floor of the warehouse below the stacked dairy cases and support rails 9. On the first tier, gravity-feed storage lanes may be provided which include roller conveyors 27 for transporting the stacked dairy cases 31 off of the article transporter 5 shown in FIG. 1. The roller conveyor 27 is disclosed in detail in the discussion of FIGS. 9–11 below.

Dairy cases 31, illustrated in FIG. 2, are stacked side by side and six high in each storage lane 8. Depending on the configuration of the storage rack structure, more rows of dairy cases may be added or removed and the dairy cases may be stacked higher or lower than six depending on the desired storage arrangement. In such a case that an additional row or rows are added to the stacked dairy cases shown in FIG. 2, additional sets of support rails 9 would be needed and additional shuttles 7, shown in FIG. 1, would be added to facilitate removing the increased load. This feature would provide added versatility in retrieving and storing palletless and palletized goods. The ability of the present invention to remove and deposit a large volume of dairy cases at one time further increases warehouse operation efficiency. Thus, a warehouse is able to satisfy a customer's order, for example, in a very efficient manner using the present invention. This feature of adding or removing automated storage components is a much needed improvement over the conventional systems noted in the Background section discussed supra.

Figure 3A:
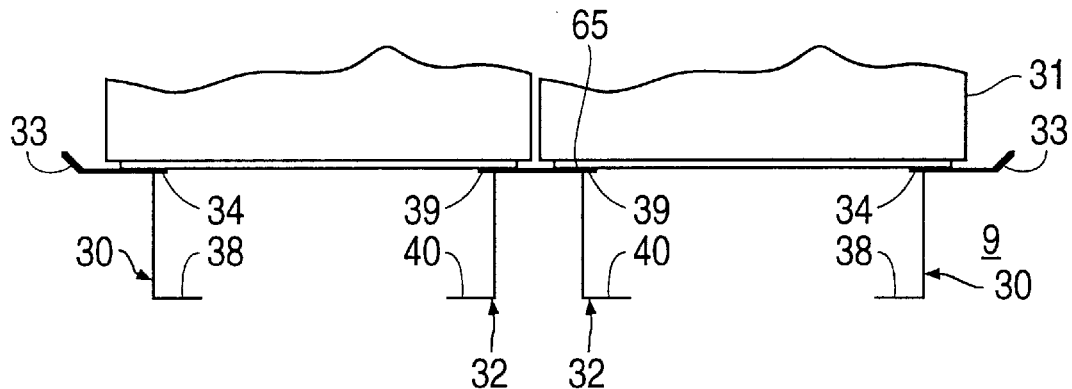
FIG. 3a shows a magnified front elevational view of the rail design in one embodiment of the present invention for supporting dairy cases without a pallet.
Figure 3B:
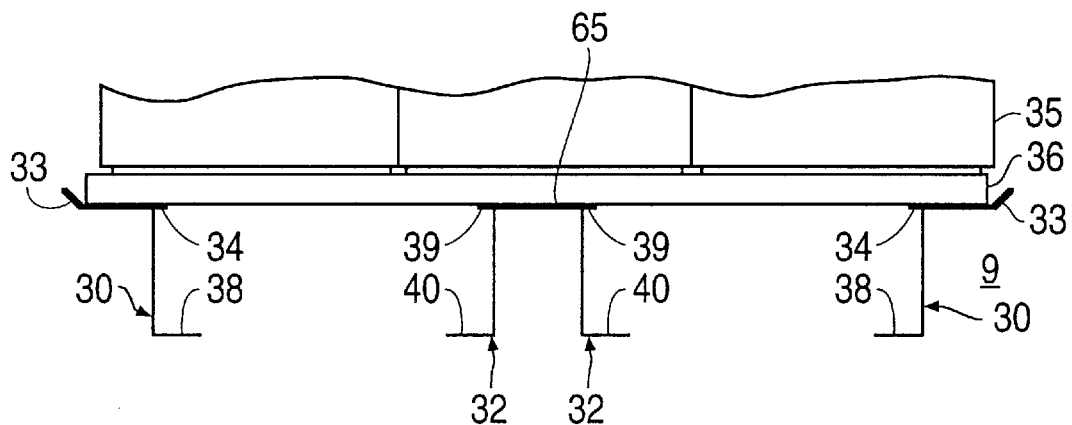
FIG. 3b shows a magnified front elevational view of the rail design of one embodiment of the present invention for supporting dairy cases with a pallet.
Figure 3C:
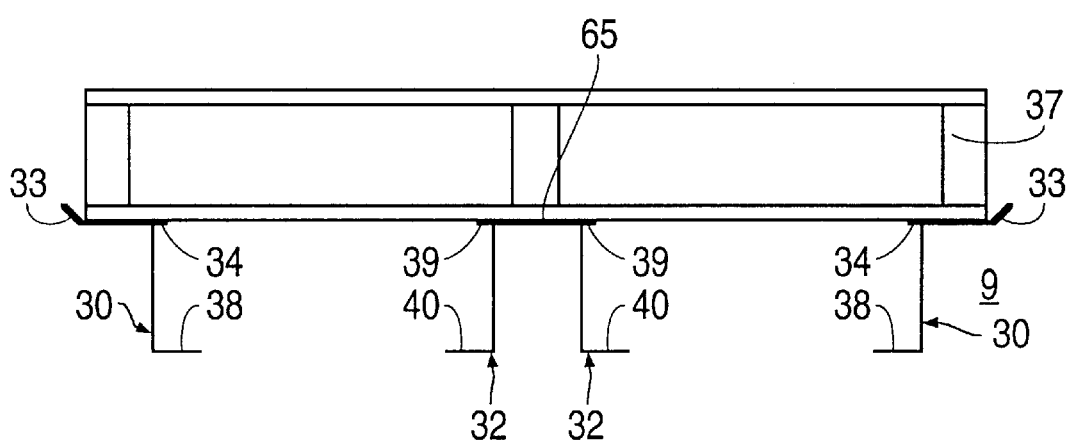
FIG. 3c shows a magnified front elevational view of the rail design of one embodiment of the present invention for supporting stackable goods with a Grocery Manufacturers Association (GMA) pallet.

FIGS. 3*a*, 3*b* and 3*c* show different storage configurations utilized with the present invention. FIG. 3*a* shows one embodiment of the present invention by illustrating a fragmented view of dairy cases 31 resting on support rails 9. In this embodiment, twenty four quart dairy cases are stored on support rails 9 without a pallet. As shown in these figures, 3*a*–3*c* support rails 9 include outer support rails 30 and inner support rails 32. The outer support rails include an upper lip portion 34 and a lower lip portion 38 which extend inward towards inner support rails 32. Rigidly attached to the upper portion of outer support rails 30 is an outer lip attachment 33 which extends horizontally outward for a predetermined distance and tapers upward at its ends. Outer lip attachment 33 prevents dairy cases 31 from sliding off of support rails 9 as the dairy cases are moved within the storage lanes. In addition, the automated storage system is designed to withstand reasonable amounts of seismic activity. In particular, outer lip attachment 33 prevents the dairy cases from vibrating off of support rails 9 during an earthquake. Moreover, outer lip attachment 33 contains any leakage from the dairy cases stored thereon in so that the storage lanes may be subsequently cleaned.

Inner support rails 32 are positioned between outer support rails 9 and include an upper lip portion 39 and a lower lip portion 40 which extend outward towards the outer support rails 30. The inner support rails provide support for various types of loads, such as dairy cases in the preferred embodiment, and other similar palletless or palletized loads. Both the outer support rails and inner support rails are manufactured from a rigid material such as galvanized steel.

Inner support rails 32 are spaced, respectively from outer support rails 30 by a distance sufficient to allow shuttle 7 to pass therebetween when transporting an article along a storage lane. The inner support rails are further spaced apart by a substantial horizontal distance to provide distributed support to dairy cases stored directly on the rails.

A bridge 65 is used to connect at least two of the inner support rails and provides a support platform for supporting palletless articles stored thereon. The bridge will be discussed in greater detail with respect to FIG. 5 below.

FIG. 3*b* shows an alternative embodiment of the present invention for storing sixteen and/or twenty four quart dairy cases 35 on support rails 9. The present invention is designed to store dairy cases, such as sixteen and twenty-four quart dairy cases, directly on support rails 9 without the need for an undergirding pallet. Although FIG. 3*b* illustrates these types of dairy cases used with a pallet, the present invention also allows for palletless storage.

Referring now to FIG. 3*b*, pallet 36 provides additional support for smaller dairy cases that are stacked on support rails 9. The pallet used in this embodiment is smaller and easier to manipulate than the conventional Grocery Manufacturers Association (GMA) pallet used in the industry. As can be seen in FIG. 3*b*, outer lip attachment 33 guides pallet 36 along the storage lanes and prevents the pallet from sliding or vibrating off of support rails 9 during seismic activity.

In a further alternative embodiment shown in FIG. 3*c*, a GMA pallet 37 is used and stored on support rails 9. The GMA pallet 37 is a large, standard industry pallet (measuring, generally, 48"×40"×5.5") and is conventionally used with forklifts to manipulate stacked goods stored thereon. Because many warehouses still use the GMA pallet, the present invention has been designed to facilitate the GMA pallet design shown. Hence, automated storage system 1 provides a warehouse with a wide range of versatility with regard to product storage.

The design of FIG. 3*a* is more preferable in the industry because the use of pallets adds an undesirable element to storage operation. The conventional GMA pallet 37 shown in FIG. 3*c* tends to take up space and adds to the overall operation cost of the warehouse. For example, when articles are completely removed or "picked" from a pallet, the pallet must be manually moved to a designated return lane for later usage. The time needed to manipulate pallets decreases the efficiency of warehouse operation. By storing the cases directly on the support rails, the warehouse operator can reduce the amount of storage space needed and does not have to worry about maintaining a fresh inventory of pallets. In addition, pallets can break and require replacement which adds to the cost of maintaining warehouse operation.

The lateral distances between the inner support rails of each support rail set arranged beneath each palletless article may range between five and fifty percent of the lateral distance between one outer support rail and its respective inner support rail to provide a variety of storage configurations. The preferred distance with respect to the lateral distance between the inner support rails of one support rail set is three and seven-eighths inches. The preferred distance with respect to the lateral distance between one outer rail and its respective inner rail is seventeen inches. These distances, however, may vary depending on the desired storage configuration.

Figure 4A:
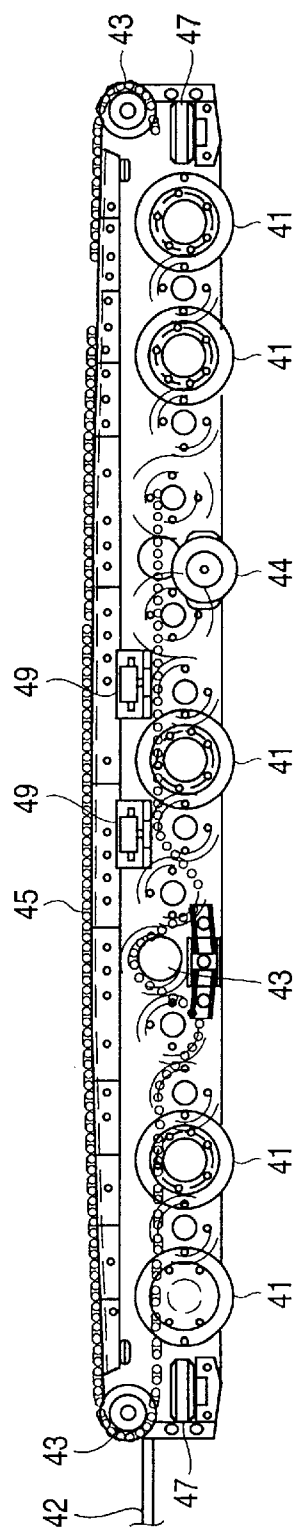
FIG. 4a shows a side elevational view of a shuttle in accordance with one embodiment of the present invention.

FIG. 4*a* shows a side elevational view of shuttle 7 in accordance with one embodiment of the present invention. The type of shuttle depicted herein is described and illustrated in International Application No. PCT/EP95/00738 filed on Mar. 1, 1995 to Upmeyer. An appropriate type of shuttle is manufactured by WESTFALIA-WST-SYSTEMTECHNIK GMBH & CO. KG, Industriestrasse 11, D-33829 Borgholzhausen, Germany, and sold under the trademark SATELLITE®. Shuttle 7 is controlled through a cable 42 which is linked to article transporter 5. As stated above, information with regard to the storage and retrieval of dairy cases is sent from an external computer system (not shown) to the article transporter 5. This command information is transferred to shuttle 7 via cable 42 to accomplish a desired task. Shuttle 7 also receives its power through cable 42.

Figure 5A:
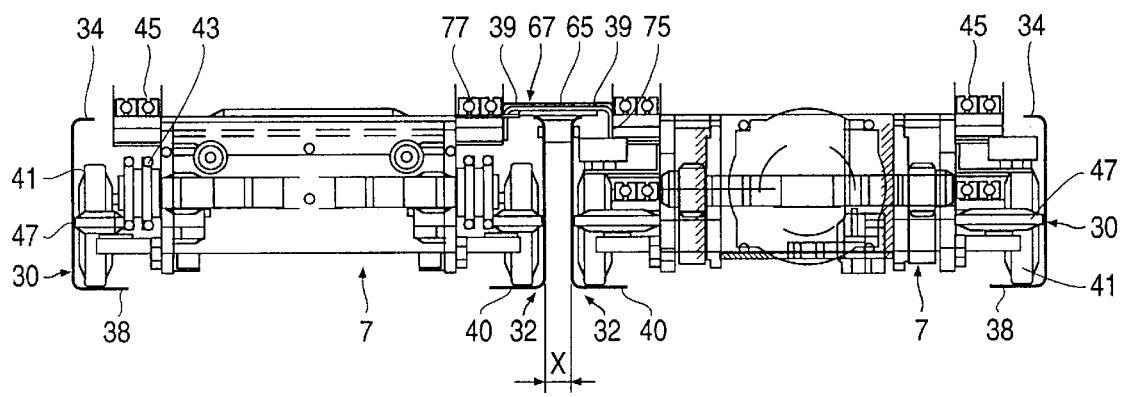
FIG. 5a shows a front elevational view of a distance "X" between the center rails of the support rail system and two shuttles coupled together in accordance with one embodiment of the present invention.
Figure 5B:
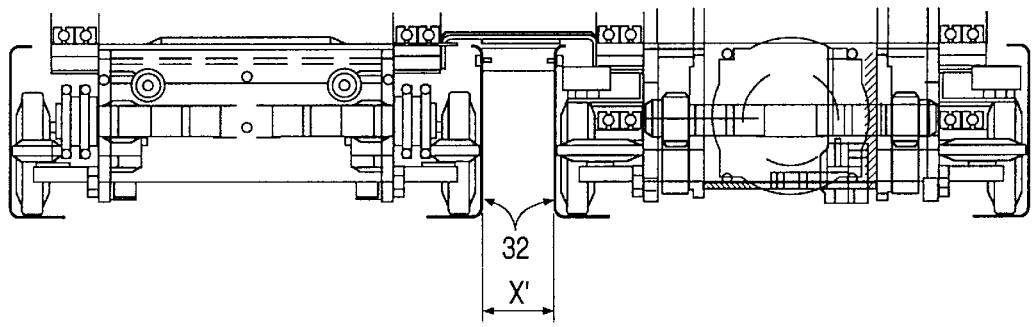
FIG. 5b shows a front elevational view of a distance "X'" between the center rails of the support rail system and two shuttles coupled together in accordance with an alternative embodiment of the present invention.
Figure 5C:
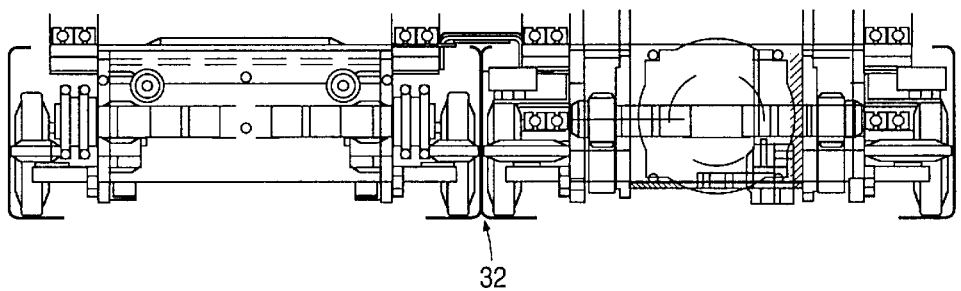
FIG. 5c shows a front elevational view of the center rails of the support rail system in an abutting relationship and two shuttles coupled together in accordance with an alternative embodiment of the present invention.

As shown in FIG. 4*a*, shuttle 7 includes a series of wheels 41 which move shuttle 7 along support rails 9 as shown in FIGS. 5*a*–5*c* discussed below. Wheels 41 allow forward and backward movement along support rails 9 for the storage and retrieval process. Chain conveying wheels 43 are positioned along the sides of shuttle 7 to engage chain 45 for lifting and depositing dairy cases. Rail brush wheel 44 is provided to clean support rails 9 as the shuttle moves therein. The shuttle further includes horizontal side wheels 47 which help to guide and center the shuttle by engaging the inner surface of the support rails. Upper side wheels 49 are also employed for this purpose.

Figure 4B:
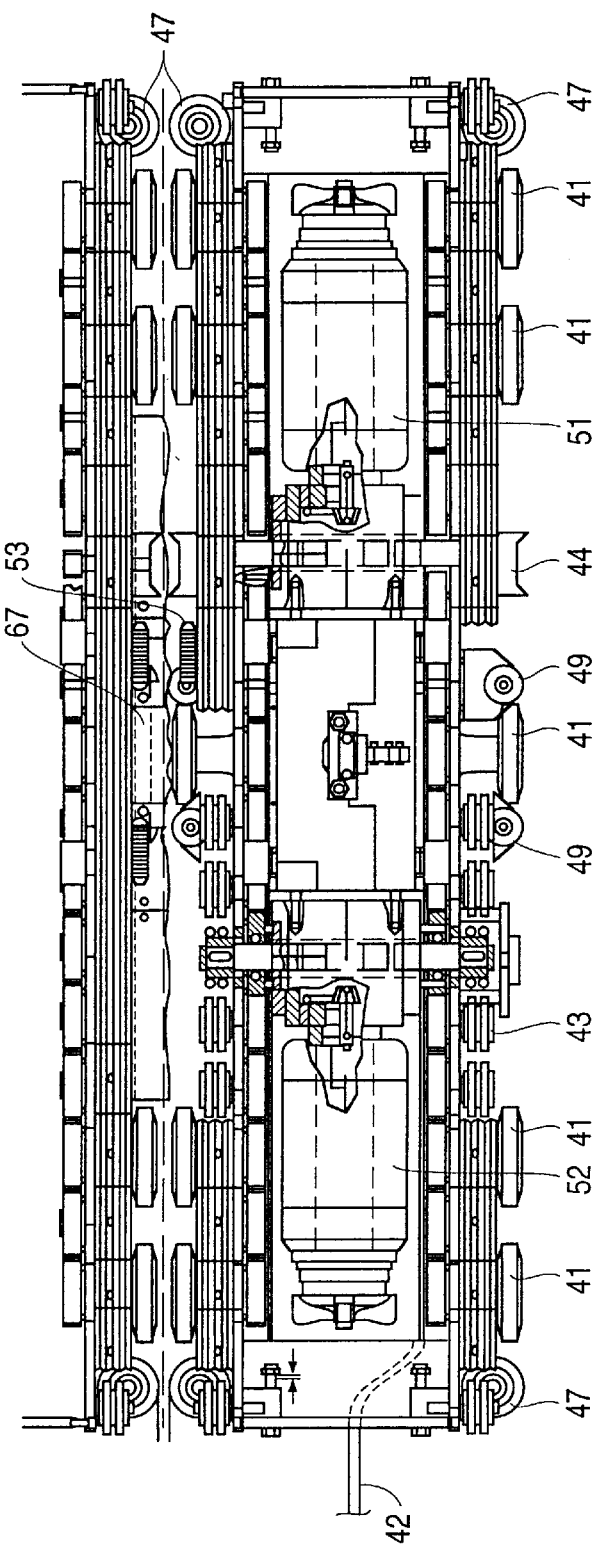
FIG. 4b shows a plan view of two shuttles coupled together in accordance with one embodiment of the present invention.

FIG. 4b illustrates a side fragmented view of two shuttles employed in the present invention. Shuttle 7 includes a propulsion motor 51 for controlling wheels 41 and rail brush wheel 44 and a chain conveying motor 52 for controlling chain conveying wheels 43. Both motors are powered through cable 42 and can operate in forward or reverse as desired for movement of shuttle 7 within support rails 9 or to lift or deposit a load.

As shown in FIG. 4b, the shuttles are coupled together using a shuttle bridge 67 which is electrically conductive and rigidly attaches two or more shuttles together such that each shuttle moves with respect to the other. The shuttle bridge is shorter than the length of the shuttles and rides above bridge 65 during shuttle operation.

Shuttle bridge 67 contacts electrical connectors 53 on each shuttle so that the shuttles are electrically connected. This allows power and control information supplied to one shuttle via cable 42 to be supplied to other shuttles through shuttle bridge 67. Additional shuttles may be used in connection with the two shuttles of FIG. 4b should the storage lanes be designed with sufficient width and additional inner support rails be added. Such additional shuttles could be added or removed from the system as needed.

Alternatively, a shuttle may be used independently within each storage lane without being coupled to other shuttles via shuttle bridge 67. In this embodiment, the shuttles do not have to move in unison to store or retrieve palletless articles. This embodiment, however, requires each shuttle to be powered and controlled independently through a separate cable 42. The preferred embodiment only requires one cable 42 for powering and controlling multiple shuttles.

FIGS. 5a, 5b and 5c illustrate two shuttles 7 within support rails 9. These figures are provided to illustrate different embodiments of the present invention where the distance between the inner support rails 32 is increased or decreased depending on the environment in which the automated storage system is used. In each embodiment, the shuttles 7 are shown from different perspectives. The left shuttle illustrates a front view of its chain conveyer components as discussed with regard to FIGS. 4a and 4b. The right shuttle illustrates a front view of its propulsion components as also discussed in reference to FIGS. 4a and 4b. In the present invention, only the lateral distances between the rails are changed to accommodate various storage configurations and not the dimensions of the shuttle.

As a further note, FIG. 5a has been labeled completely to show the components discussed above. The same labels are purposely excluded from FIGS. 5b and 5c since these identified components are common to all three figures. Also common to FIGS. 5a–5c are bridge 65 and shuttle bridge 67 which includes downwardly extending lip portions 75 and 77 for connecting the shuttles. The horizontal section of bridge 65 covers the upper lip portions of the inner support rails 32 as shown in the figures.

The distance denoted by "X" in FIG. 5a represents the distance between inner support rails 32. This distance is significant, in that, these rails may be moved inwardly or outwardly to provide distributed vertical support and facilitate different types of cartons or goods stored thereon. For example, when the inner support rails are positioned in close proximity to one another and covered by a bridge 65 that is relatively short in width the support rails 9 may accommodate certain types of dairy cases or other loads which do not require a large center support, such as larger sized dairy cases. These types of loads may include certain palletized loads where the pallet could simply rest on the upper lip of the outer support rails as well as the flat upper surface of bridge 65. This design allows the pallets to be triple supported to limit deflection of the pallet and increase its useful life.

FIG. 5b shows a larger distance "X'" between inner support rails 32 which can be used as the rail design for the present invention. This support rail design has a longer upper bridge surface which covers the inner support rails 32 and also has a wide enough distance "X'" to facilitate the storing and retrieval of dairy cases preferably twenty-four quarts in size. Because of the distance between outer support rails 30 and bridge 65, this rail design provides adequate support for dairy cases having a twenty-four quart capacity. This rail design, however, also facilitates other palletized and palletless load configurations which may be stored on outer support rails 30 and inner support rails 32 via bridge 65.

FIG. 5c shows another alternative embodiment of support rails 9 wherein inner support rails 32 are in an abutting relationship with one another. Thus, there is no distance "X" or "X'" between the two inner support rails and bridge 65 covering the upper lip portions of inner support rails 32 is shortened in length with respect to the above embodiments. In this design the surface area of the bridge is much smaller, thus, accommodating further types of palletized and palletless loads. In addition, bridge 65 may further be lengthened to accommodate sixteen quart dairy cases or other similar sized cases that are stored on support rails 9 without an undergirding pallet. One skilled in the art should recognize that the rail design system of the present invention may be configured in any manner which would facilitate the storage of any palletized and palletless load.

Figure 6B:
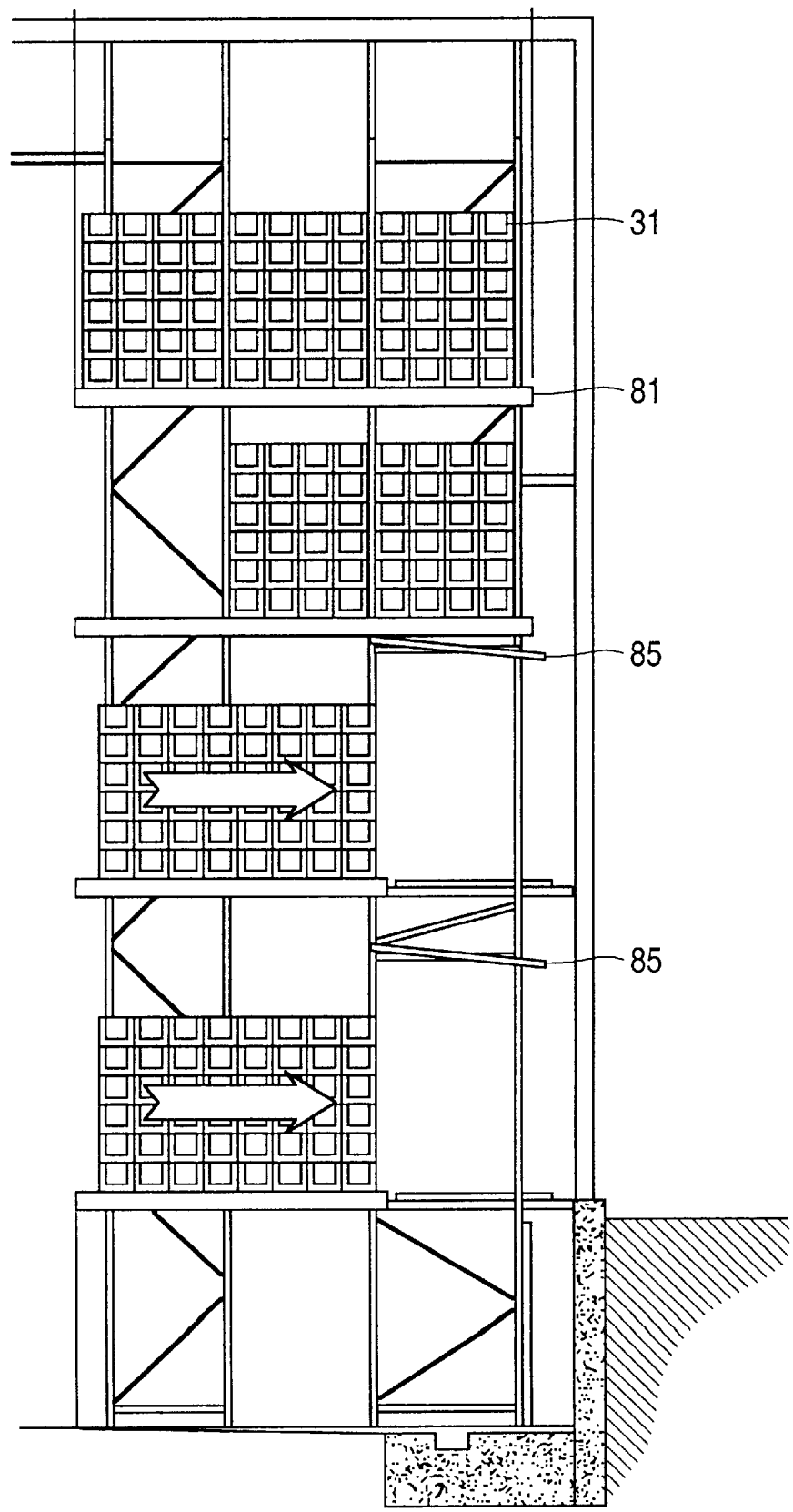
FIG. 6b shows a front elevational view of a storage rack having support rails with drip pans attached thereto in accordance with an alternative embodiment of the present invention.

FIGS. 6a and 6b are directed to an alternative embodiment of the present invention wherein the support rails are designed to collect leakage, if any, from the dairy cases stored thereon and remove the leakage from the support rails to a predetermined location.

Referring to FIG. 6a, rail system 81 includes a double trough 82 and bridge support 84 manufactured and folded from one piece of galvanized steel. This rail design facilitates the storage of dairy cases 31 thereon but further allows any spillage collected in the trough to be washed away using a sprinkler system 83. Sprinkler system 83 includes a set of washdown pipes and nozzles for spraying down the troughs of rail system 81 either continuously or at predetermined intervals. Alternatively, rail system 81 may be cleaned manually by having personnel use the shuttles to position themselves at strategic locations on the storage racks to spray down the troughs.

The troughs are able to drain via drip pan outlet 85 shown in FIG. 6b. This drip pan outlet 85 is attached to the storage racks and is positioned at an angle to allow the dairy case leakage to drain off into a designated area. An advantage of this embodiment is that personnel working under the storage racks will not be subjected to dairy case spillage. In essence, this embodiment of the present invention maintains the cleanliness of the environment in which automated storage system 1 is used and provides the user with an effective means of storing dairy cases as well as providing "self-cleaning" functionality for the warehouse facility. In addition, the "drip pan" design of rail system 81 allows personnel to walk inside the storage lanes safely.

Figure 8:
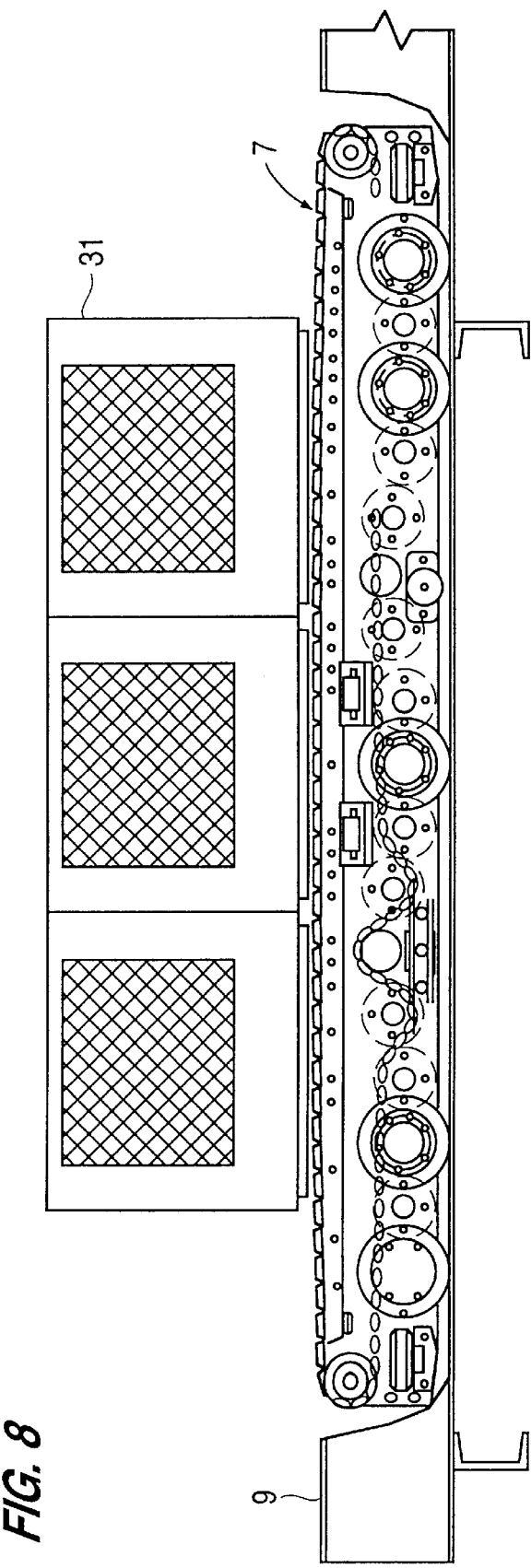
FIG. 8 shows a side elevational view of the shuttle carrying dairy cases thereon in accordance with one embodiment of the present invention.

The operation of the shuttle 7 in the present invention will now be described in detail referring to FIGS. 7 and 8. To retrieve a stack of dairy cases, shuttle 7 is activated via cable 42, shown in FIGS. 4a and 4b, while resting in the arms of article transporter 5 shown in FIG. 1. Shuttle 7 begins to move along support rails 9 until the desired load is located. Upon locating the desired load, chain 45 of shuttle 7 is activated and engages the desired load. The top plane of shuttle 7 is slightly curved to allow chain 45 to effectively "grab" the dairy cases and pull them onto the shuttle surface, as shown in FIG. 8. The shuttle moves in the opposite direction of the chains in a synchronized fashion and at the same speed to lift the dairy cases off of the support rails. Once the load is centered, the chains deactivate and the shuttle returns to the article transporter. For depositing a load, the method is reversed, in that, the load is carried by the shuttle to a specified location on storage racks 2 where the load is to be deposited. At this point, chain 45 is again activated and the load is "rolled off" by the conveying chain of the shuttle platform while the shuttle moves in the opposite direction of the chains in a synchronized fashion. After depositing the load, shuttle returns to article transporter 5.

Figure 9:
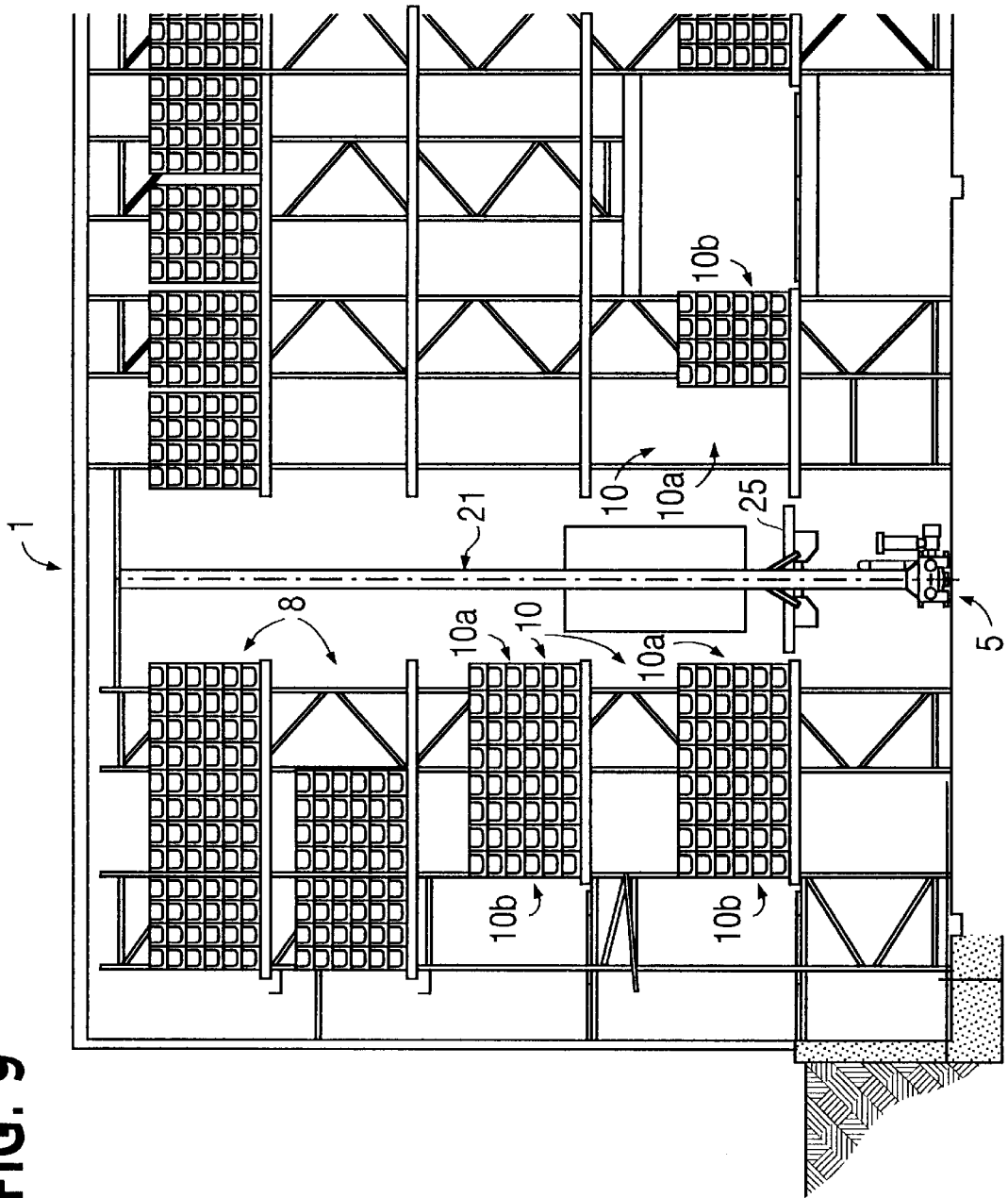
FIG. 9 shows a side profile view of a storage rack including gravity-feed storage lanes with roller conveyors.

FIG. 9 shows a side profile view of the automated storage system 1 of the present invention including the article transporter 5 discussed above and gravity-feed storage lanes 10 where the storage lane exit 10b is at a lower elevation than the storage lane entrance 10a thereby creating a downward slope in the storage lanes. These gravity-feed storage lanes 10 include roller conveyors 27 (not shown in FIG. 9) and use gravitational forces to transport the stacked dairy cases 31 from the storage lane entrance 10a to the storage lane exit 10b.

Figure 10:
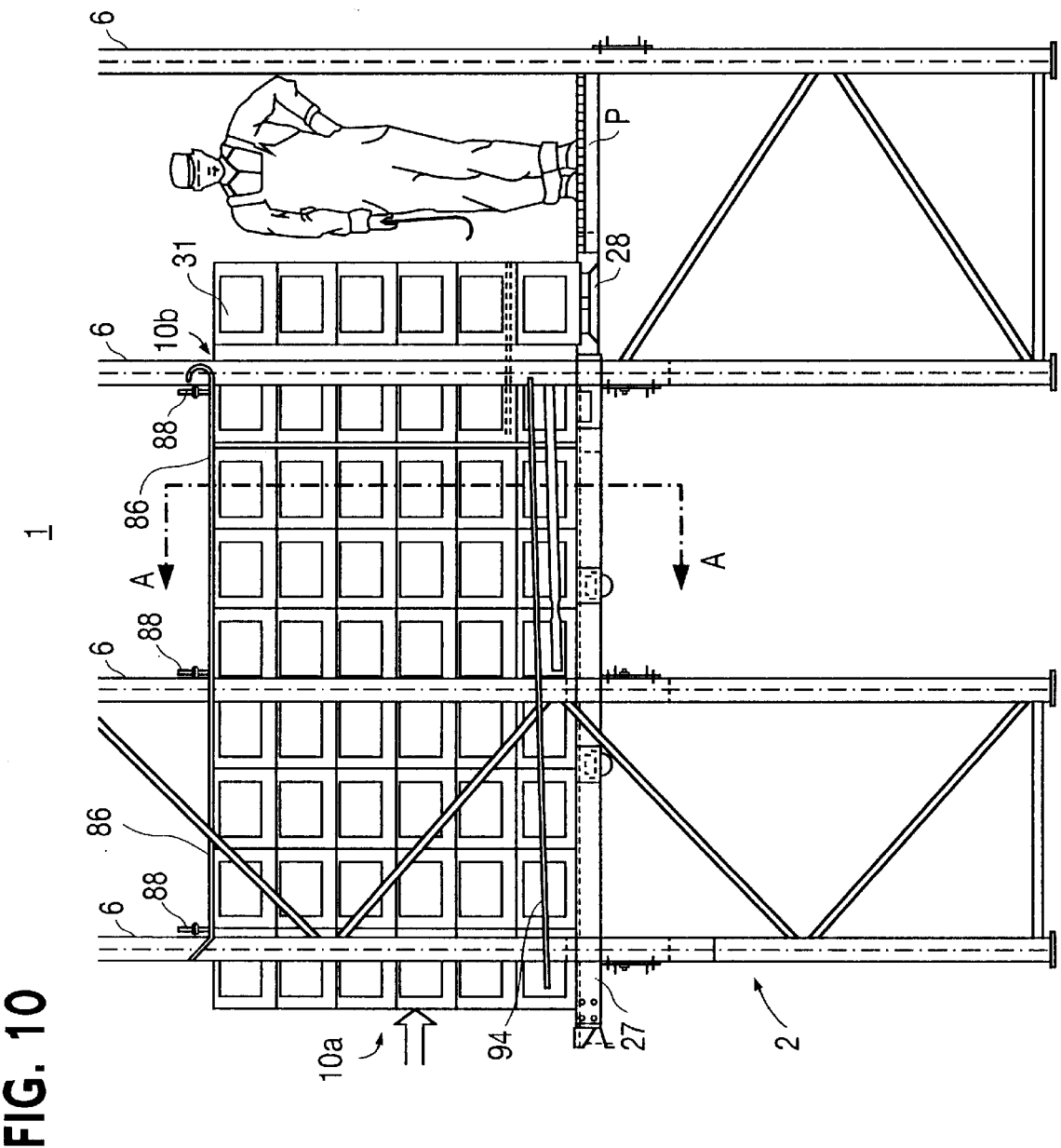
FIG. 10 shows an enlarged side profile view of one gravity-feed storage lane with a top guide rail, a side guide rail and a roller conveyor.

FIG. 10 shows an enlarged side profile view of one of the gravity-feed storage lanes 10 in FIG. 9 clearly showing the downward slope of the storage lane. The storage lane entrance 10a which receives the stacked dairy cases 31 from the article transporter 5 is at a higher elevation than the storage lane exit 10b. The gravity-feed storage lane 10 includes a roller conveyor 27 which extends the length of the gravity-feed storage lane 10 and vertically supports the dairy cases 31 within the lane. Because of the downward slope caused by the elevational difference between the storage lane entrance 10a and storage lane exit 10b, gravitational forces causes a net displacement force indicated by arrow F, to act upon the dairy cases 31 thereby transporting the dairy cases 31 from the storage lane entrance 10a to the storage lane exit 10b. The difference in elevation between the storage lane entrance 10a and storage lane exit 10b determines the magnitude of the net displacement force F. The difference in elevation is determined by considering several important factors including the mass of the article to be transported, the geometry of the cases, the length of the roller conveyor 27 and frictional losses during transport. In addition, a stop mechanism (not shown) may be provided to ensure a positive stop of the dairy cases 31 at the storage lane exit 10b.

An off-load conveyor 28 is located at the storage lane exit 10b to receive the dairy cases 31 from the storage lane exit 10b for manual handling by the operator standing on platform P. FIG. 10 also shows top guide rail 86 and side guide rail 94 mounted on the rigid framework which prevent the dairy cases 31, from tilting, tipping or misaligning when the dairy cases 31 are transported through the gravity-feed storage lane 10 on the roller conveyor 27. Although the top guide rail 86 and the side guide rail 94 are disclosed and discussed below as applied to a gravity-feed storage lane 10, these rails may also be effectively used in conjunction with the storage lanes 8 discussed previously to prevent tilting and tipping of the dairy cases 31 as they are transported by the shuttle 7.

Figure 11:
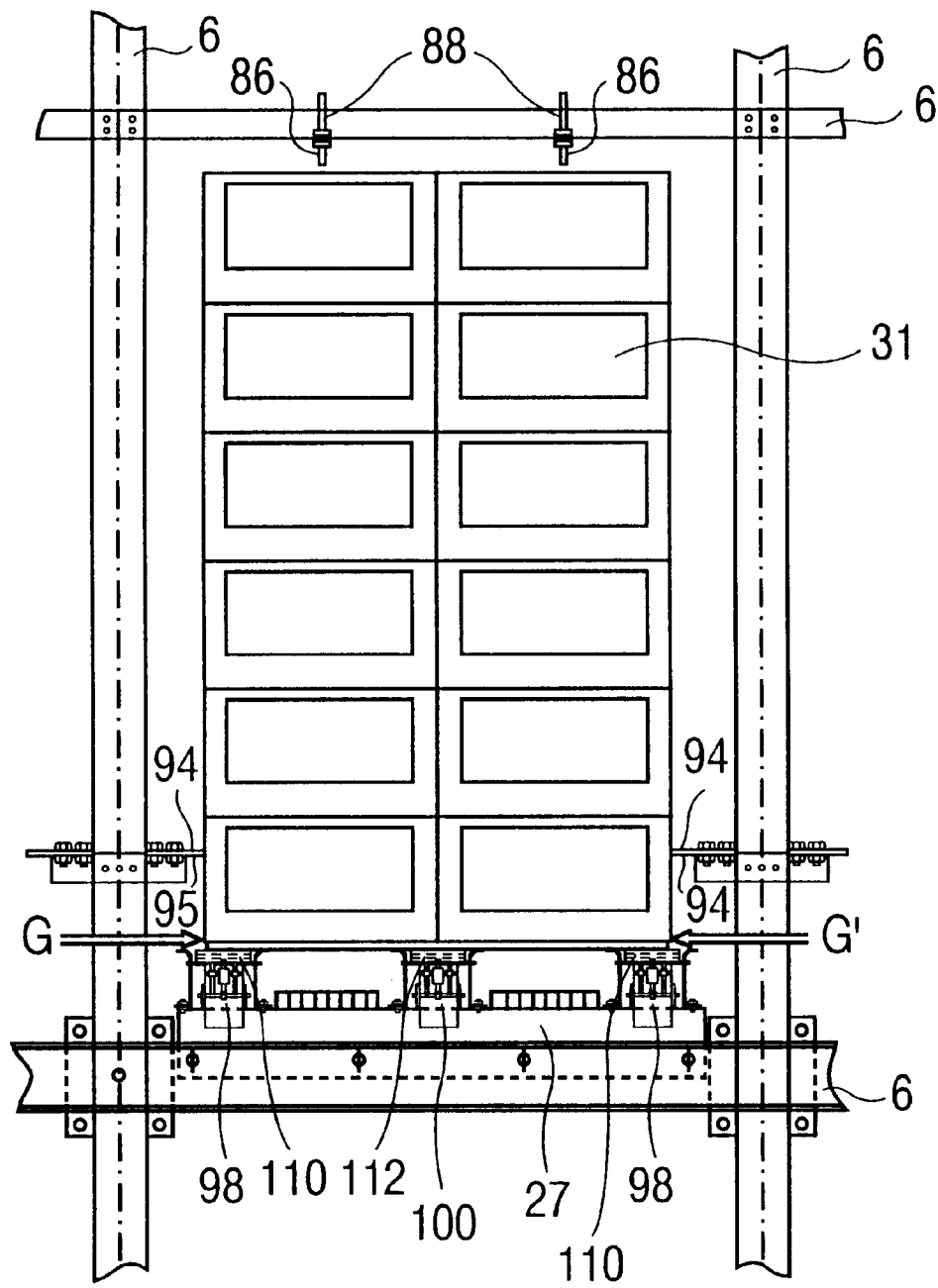
FIG. 11 shows a cross-sectional view of the storage lane shown in FIG. 10 as viewed in the direction indicated by arrows 11 clearly showing the top guide rails, the side guide rails and the roller conveyor with two outer roller rails and one inner roller rail.

FIG. 11 shows a cross-sectional view of the gravity-feed storage lane 10 shown in FIG. 10 as viewed in the direction indicated by arrows A—A. The figure clearly shows the gravity-feed storage lane 10 with a roller conveyor 27 which includes two outer roller rails 98 and one inner roller rail 100. Both the two outer roller rails 98 and one inner roller rail 100 include a plurality of rollers (only 110 and 112 are shown) positioned along the length of the rail to support and transport the dairy cases 31. As clearly shown in the figure, the two outer roller rails 98 and one inner roller rail 100 are positioned on the roller conveyor 27 so as to receive and support the stacked dairy cases 31 at the same position as the outer support rails 30 and the inner support rails 32 such that the dairy cases 31 can be easily transferred from the support rails on to the roller rails. Thus, in the present example, the roller rails are positioned so that at least two twenty-four quart dairy cases can be stored side-by-side or two sixteen quart cases can be stored and transferred side-by-side with or without an undergirding pallet. This positioning of the two outer roller rails 98 and one inner roller rail 100 thus allows efficient storage and transport of the dairy cases from the storage lane entrance 10a to the storage lane exit 10b in the gravity-feed storage lane 10.

In addition, the two outer roller rails 98 may also include tilt-in rollers 110 which are angled slightly towards the center (longitudinal axis) of the gravity-feed storage lane 10. This slight angling of the tilt-in rollers 110 creates lateral forces on the dairy cases 31 in the direction away from the outer edges of the gravity-feed storage lane 10. Because there are two outer roller rails 98, equal opposing lateral forces indicated as G and G' are exerted on the dairy cases 31. However, because the forces G and G' are opposing and equal in magnitude, the forces do not act to laterally displace the dairy cases but rather, the forces simply act to prevent the misalignment and separation of the side-by-side dairy cases 31 as they are transported on the roller conveyer 27. The tilt-in effect of the tilt-in rollers 110 may be attained by utilizing shims or washers (not shown) to raise one side of the outer roller rail 98. Furthermore, the placement of the two outer roller rails 98 may be laterally offset from the inner roller rail 100 in a staggered manner, thereby ensuring that the dairy cases 31 do not initially contact rollers on the outer roller rails 98 and rollers on the inner roller rail 100 at the same time. This lateral offset (not shown) between the rollers on the outer roller rail 98 and the rollers on the inner roller rail 100 prevents the leading edge or imperfections on the dairy cases 31 from "catching" on the rollers and tipping over as the dairy cases 31 are transported on the roller conveyor 27. FIG. 11 also clearly shows the relative positions of the top guide rails 86, the side guide rails 94, the two outer roller rails 98 and the inner roller rail 100 within the gravity-feed storage lane 10. This relative position may, of course, be modified and adjusted in accordance to the needs of the specific application to which the present invention is applied.

Figure 12:
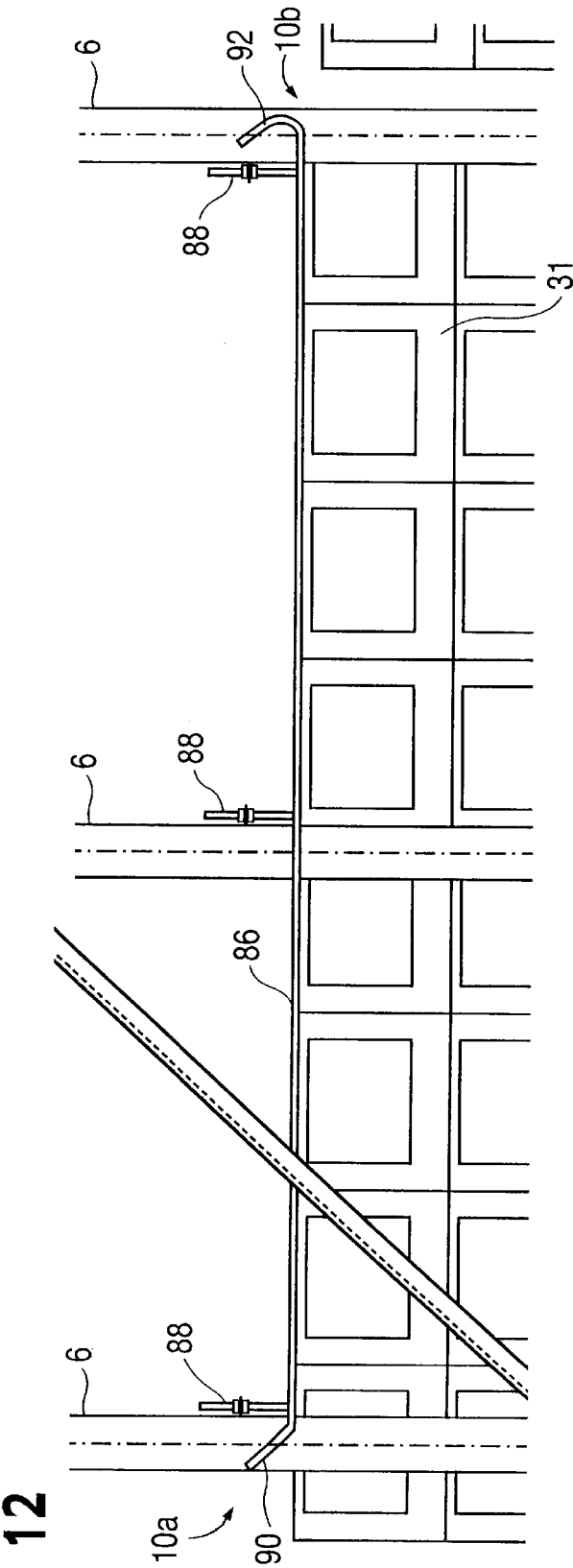
FIG. 12 shows a further enlarged view of the top guide rail shown in FIG. 10 with height adjusters and fasteners securing the top guide rails to the rigid framework of the storage rack.

FIG. 12 clearly shows an enlarged view of the top guide rail 86 shown in FIG. 10 as applied to the gravity-feed storage lane 10. The top guide rail 86 extends the substantial length of the gravity-feed storage lane 10 and includes height adjusters 88 which secure the top guide rail 86 to the rigid framework of the storage rack by fasteners 114. The height adjusters 88 allows the position of the top guide rail 86 to be adjusted by rotating the fasteners 114 to allow smooth movement of the dairy cases 31 within the gravity-feed storage lane 10 (or storage lane 8) while preventing the dairy cases 31 from tipping or tilting within the lane. The top guide rail 86 includes an angled portion 90 at the storage lane entrance 10a to allow the dairy cases 31 to smoothly enter the gravity-feed storage lane 10 when delivered by the shuttle 7. In one embodiment of the present invention, an angled portion 90 with approximately 45 degree angle relative to the angle of the top guide rail 86 has been found to be effective in allowing the dairy cases 31 to enter the gravity-feed storage lane 10 in a smooth manner. In addition, the top guide rail 86 also includes a radiused portion 92 at the storage lane exit 10b which allows the dairy cases 31 to pivot about the radiused portion 92 thereby allowing the dairy cases 31 to smoothly exit the gravity-feed storage lane 10 on to the off-load conveyor 28 which is on a level plane.

Figure 13:
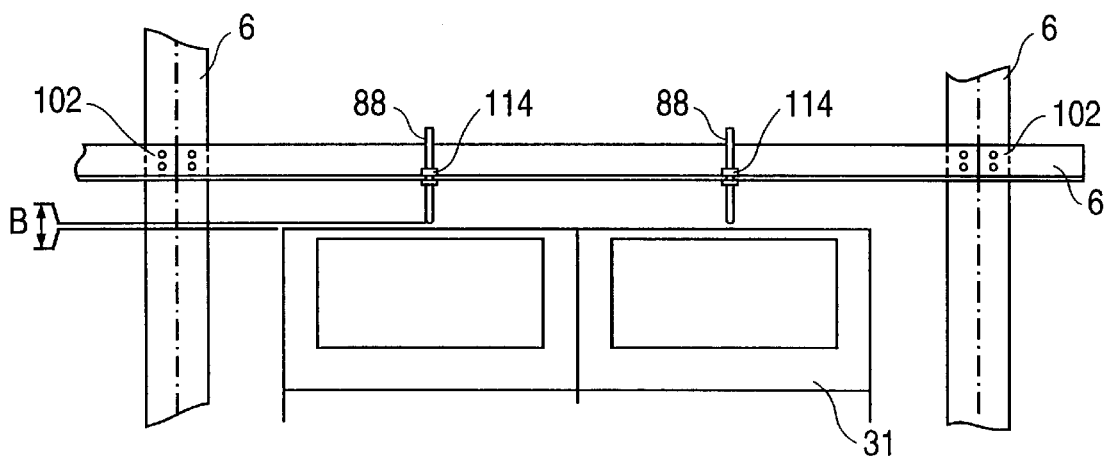
FIG. 13 shows the adjustable clearance between the top guide rail and the article being transported.

FIG. 13 shows the adjustable height clearance B between the top guide rails 86 and the articles being transported, which in this example, are stacked dairy cases 31. It is important to realize that the top guide rails 86 do not normally contact the dairy cases 31 as they are transported through the gravity-feed storage lane 10. The adjustable height clearance B are adjusted by turning fasteners 114 so that the top guide rails 86 contact the dairy cases 31 only when the dairy cases 31 begin to tilt or tip within the gravity-feed storage lane. An adjustable height clearance A value of 0.25 inches have been found to be effective in preventing dairy cases 31 from tilting or tipping in a gravity-feed storage lane 10.

Figure 14:
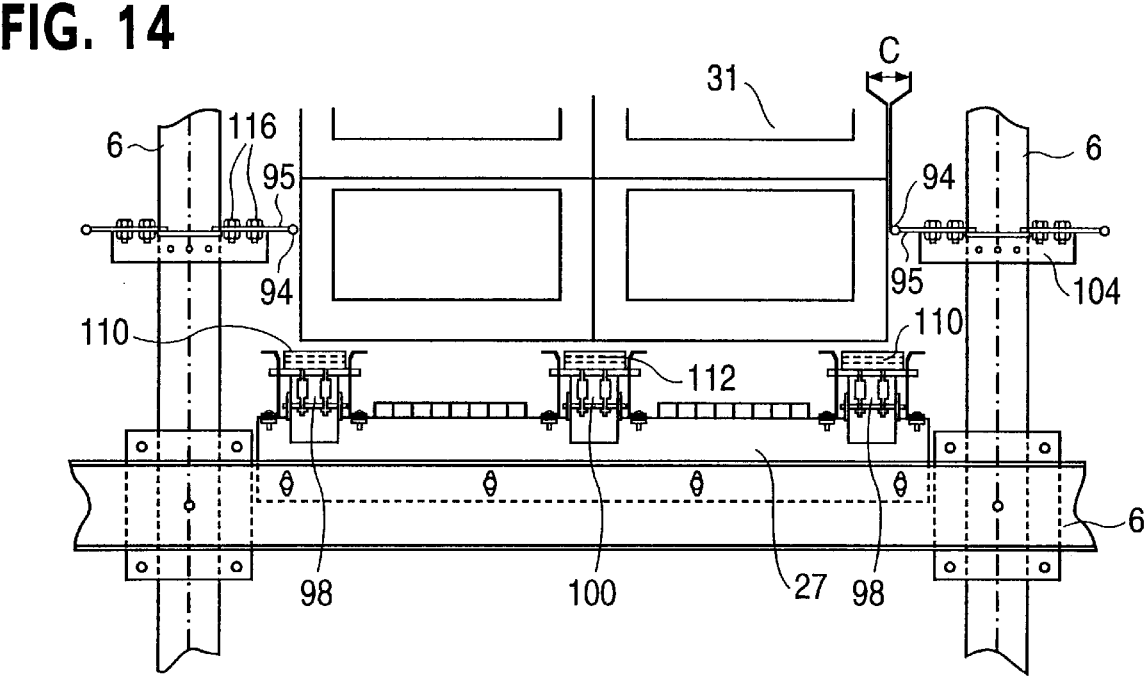
FIG. 14 shows the position adjusters and fasteners securing the side guide rails to the rigid framework of the storage rack, the adjustable clearance between the side guide rail and the article being transported, and the roller conveyor with one inner roller rail and two outer roller rails with tilt-in rollers.

In a similar manner, the side guide rails 94 act to prevent misalignment of the dairy cases 31 in the gravity-feed storage lane 10 (or storage lane 8). FIG. 14 shows the position adjusters 95 which secure the side guide rails 94 to the rigid framework of the storage rack by fasteners 116. The position adjusters 95 allows the position of the side guide rails 94 to be adjusted so as to allow smooth movement of the dairy cases 31 by turning fasteners 116. Thus, like the top guide rails 86, the side guide rails 94 do not normally contact the dairy cases 31 as they are transported through the gravity-feed storage lane 10. In this regard, adjustable side clearance C may be incorporated such that the side guide rails 94 only contact the dairy cases 31 when the dairy cases 31 begin to misalign or rotate within the lane. The figure also shows the side guide rails 94 mounted on mounting bracket 104 which allows another side guide rail to be mounted at the other end of the mounting bracket 104 for an adjoining storage lane. As previously noted, these top guide rails 86 and side guide rails 94 may also be used in conjunction with the storage lanes 8 discussed previously to prevent tilting, tipping and misaligning of the dairy cases 31 as they are transported by the shuttle 7.

While the invention has been described with reference to the aforementioned embodiments, it should be appreciated by those skilled in the art that the invention may be practiced otherwise than as specifically described herein without departing from the spirit and scope of the invention. It is therefore understood that the spirit and scope of the invention be limited only by the appended claims.

What is claimed is:

1. A compact automated storage system for receiving, storing and returning palletless articles, comprising:

a storage rack having a rigid support framework containing a plurality of open ended storage lanes having a cross sectional extent sufficient to allow the palletless articles to be conveyed into and out of said storage lanes, said open ends of said storage lanes being generally positioned adjacent a shelving pathway extending along said storage rack;

an article transporter, movable within said shelving pathway, between loading/unloading stations in which said article transporter is alignable with corresponding open ends of said storage lanes, said article transporter including at least one shuttle means for moving an article along a storage lane when said article transporter is aligned with the open end of said storage lane and for vertically moving an article into and out of a stored position within said storage lane; and a plurality of support rail sets mounted on said support framework, respectively, within said plurality of open ended storage lanes, each said support rail set including a pair of outer support rails for providing vertical support to articles located in stored positions within the corresponding said storage lane and at least one pair of inner support rails for providing additional vertical support to said articles, said at least one pair of inner support rails being spaced, respectively, from said outer support rails by a distance sufficient to allow said shuttle means to pass therebetween when transporting an article along said storage lane, said inner support rails being spaced apart by a substantial horizontal distance to provide distributed support to articles stored directly on said plurality of support rail sets, whereby said storage system is adapted to provide undergirding support that is distributed to accommodate palletless articles.

2. The system of claim 1 further comprising a bridge means which connects at least two of said inner support rails and provides a support platform for supporting palletless articles stored thereon.

3. The system of claim 1 wherein said outer support rails and said inner support rails of said support rail set are spaced apart in a manner that facilitates the storage of at least one of the following:

at least two twenty-four quart dairy cases stored side-by-side on said support rail set supported without an undergirding pallet;

at least two sixteen quart cases stored side-by-side on said support rail set; and articles supported by a pallet conforming with the standards of the Grocery Manufacturers Association.

4. The system of claim 3 wherein said at least two sixteen quart cases are supported with an undergirding pallet.

5. The system of claim 1 further comprising at least one top guide rail connected to said rigid support framework in at least one of said storage lanes for limiting tipping motion of said articles within said storage lanes and at least one side guide rail connected to said rigid support framework in at least one of said storage lanes for limiting misalignment of said palletless articles within said storage lanes.

6. The system of claim 1 further comprising at least one of said storage lanes including a gravity conveyor positioned to create a downward slope, said gravity conveyor including two outer roller rails and at least one inner roller rail for supporting and transferring said palletless articles, said two outer roller rails including a plurality of rollers and said at least one inner roller rail including a plurality of rollers.

7. The system of claim 6 wherein said two outer roller rails further include tilt-in rollers wherein said tilt-in rollers are angled towards a longitudinal axis of said storage lane to create counteracting lateral forces on said palletless articles to prevent misalignment of said palletless articles.

8. The system of claim 6 wherein said two outer roller rails and at least one inner roller rail are spaced apart in a manner that facilitates the storage of at least one of the following:
- at least two twenty-four quart dairy cases stored side-by-side on said support rail set supported without an undergirding pallet;
- at least two sixteen quart cases stored side-by-side on said support rail set; and
- articles supported by a pallet conforming with the standards of the Grocery Manufacturers Association.

9. The system of claim 1 wherein the horizontal distance between said inner support rails ranges from 0.5 inches to 5.0 inches.

10. The system of claim 1 wherein said outer support rails include an upper lip portion and a lower lip portion which extend inward towards said inner support rails.

11. The system of claim 10 wherein said outer support rails include an outer lip attachment that is rigidly attached to the upper portion of said outer support rails for preventing the palletless articles from sliding and vibrating off of said support rail sets.

12. The system of claim 1 wherein said inner support rails include an upper lip portion and a lower lip portion which extend outward towards said outer support rails.

13. The system of claim 1 wherein said support rail sets comprise at least two troughs formed from galvanized steel in which said shuttle means is movable, said support rail sets having lip portions at its side edges for preventing the palletless articles from sliding and vibrating off of said support rail sets.

14. The system of claim 13 wherein said automated storage system further includes a sprinkler means positioned adjacent to said outer support rails for spraying down said at least two troughs, said sprinkler means including a washdown pipe and nozzle.

15. The system of claim 1 wherein the lateral distance between the inner support rails of each support rail set arranged beneath each palletless article is between five and fifty percent of the lateral distance between one outer support rail and its respective inner support rail.

16. A compact automated storage system for receiving, storing and returning palletless articles, comprising:
- a storage rack having a rigid support framework containing a plurality of open ended storage lanes having a cross sectional extent sufficient to allow the palletless articles to be conveyed into and out of said storage lanes;
- a plurality of support rail sets mounted on said support framework, respectively, within said plurality of open ended storage lanes, each said support rail set including a pair of outer support rails for providing vertical support to articles located in stored positions within the corresponding said storage lane and at least one pair of inner support rails for providing additional vertical support to said articles, said at least one pair of inner support rails being spaced, respectively, from said outer support rails by a distance sufficient to define channels therebetween, said inner support rails being spaced apart by a substantial horizontal distance to provide distributed support to articles stored directly on said plurality of support rail sets; and
- at least two shuttle means adapted to pass through the pair channels formed by each said support rail set for moving an article along a corresponding storage lane.

17. The system of claim 16 wherein said at least two shuttle means are moved in unison to retrieve, store and return palletless articles.

18. The system of claim 16 further comprising a bridge means which connects at least two of said inner support rails and provides a support platform for supporting palletless articles stored thereon.

19. The system of claim 16 wherein said outer support rails and said inner support rails of said support rail set are spaced apart in a manner that facilitates the storage of at least one of the following:
- at least two twenty-four quart dairy cases stored side-by-side on said support rail set supported without an undergirding pallet;
- at least two sixteen quart cases stored side-by-side on said support rail set; and
- articles supported by a pallet conforming with the standards of the Grocery Manufacturers Association.

20. The system of claim 19 wherein said at least two sixteen quart cases are supported with an undergirding pallet.

21. The system of claim 16 further comprising at least one top guide rail connected to said rigid support framework in at least one of said storage lanes for limiting tipping motion of said palletless articles within said storage lanes and at least one side guide rail connected to said rigid support framework in at least one of said storage lanes for limiting misalignment of said palletless articles within said storage lanes.

22. The system of claim 16 further comprising at least one of said storage lanes including a gravity conveyor positioned to create a downward slope, said gravity conveyor including two outer roller rails and at least one inner roller rail for supporting and transferring said palletless articles, said two outer roller rails including a plurality of rollers and said at least one inner roller rail including a plurality of rollers.

23. The system of claim 22 wherein said two outer roller rails further include tilt-in rollers wherein said tilt-in rollers are angled towards a longitudinal axis of said storage lane to create counteracting lateral forces on said palletless articles to prevent misalignment of said palletless articles.

24. The system of claim 22 wherein said two outer roller rails and at least one inner roller rail are spaced apart in a manner that facilitates the storage of at least one of the following:
- at least two twenty-four quart dairy cases stored side-by-side on said support rail set supported without an undergirding pallet;
- at least two sixteen quart cases stored side-by-side on said support rail set; and
- articles supported by a pallet conforming with the standards of the Grocery Manufacturers Association.

25. The system of claim 16 wherein the horizontal distance between said inner support rails ranges from 0.5 inches to 5.0 inches.

26. The system of claim 16 wherein said outer support rails include an upper lip portion and a lower lip portion which extend inward towards said inner support rails.

27. The system of claim 26 wherein said outer support rails include an outer lip attachment that is rigidly attached to the upper portion of said outer support rails for preventing the palletless articles from sliding and vibrating off of said support rail sets.

28. The system of claim 16 wherein said inner support rails include an upper lip portion and a lower lip portion which extend outward towards said outer support rails.

29. The system of claim 16 wherein said support rail sets comprise at least two troughs formed from galvanized steel in which said shuttle means is movable, said support rail sets having lip portions at its side edges for preventing the palletless articles from sliding and vibrating off of said support rail sets.

30. The system of claim 29 wherein said automated storage system further includes a sprinkler means positioned adjacent to said outer support rails for spraying down said at least two troughs, said sprinkler means including a washdown pipe and nozzle.

31. The system of claim 16 wherein the lateral distance between the inner support rails of each support rail set arranged beneath each palletless article is between five and fifty percent of the lateral distance between one outer support rail and its respective inner support rail.

32. A compact automated storage system for receiving, storing and returning articles, comprising:
   a storage rack having a multi-tiered rigid support framework containing a plurality of open ended storage lanes having a cross-sectional extent sufficient to allow the articles to be conveyed into and out of said storage lanes, said open ends of said storage lanes being generally positioned adjacent a shelving pathway extending along said storage rack, said framework further including a drip pan means rigidly attached to an end of at least one of said storage lanes, said drip pan means being inclined with respect to said storage lanes;
   an article transporter, movable within said shelving pathway, between loading/unloading stations in which said article transporter is alignable with corresponding open ends of said storage lanes, said article transporter including a plurality of shuttle means for moving an article along a storage lane when said article transporter is aligned with the open end of said storage lane and for vertically moving an article to and from any tier of the multi-tiered framework;
   a support rail means mounted on said support framework within said plurality of open ended storage lanes, said support rail means formed to include at least two troughs having a pair of outer support rails for providing vertical support to articles located in stored positions within the corresponding said storage lane and at least one pair of inner support rails for providing additional vertical support to said articles, said outer support rails and said at least one pair of inner support rails being continuously connected by bottom portions which extend the length of said outer support rails and said at least one pair of inner support rails; and
   a cleaning means connected to said rigid framework and positioned adjacent said support rail means to clean said support rail means, wherein said cleaning means is used to remove any leakage from said articles trapped in said troughs,
   wherein said at least one pair of inner support rails is spaced, respectively, from said outer support rails by a distance sufficient to allow said shuttle means to pass therebetween when transporting an article along said storage lane, said at least one pair of inner support rails being spaced apart by a substantial horizontal distance to provide distributed support to articles stored directly on said support rail means.

33. The system of claim 32 wherein said support rail means further includes a bridge support which connects at least two of said inner support rails and provides a support platform for supporting articles stored thereon.

34. The system of claim 32 wherein said support rail means is formed from a single piece of galvanized steel.

35. The system of claim 32 wherein said outer support rails and said inner support rails of said support rail means are spaced apart in a manner that facilitates the storage of at least one of the following:
   at least two twenty-four quart dairy cases stored side-by-side on said support rail set supported without an undergirding pallet;
   at least two sixteen quart cases stored side-by-side on said support rail set; and
   articles supported by a pallet conforming with the standards of the Grocery Manufacturers Association.

36. The system of claim 35 wherein said at least two sixteen quart cases are supported with an undergirding pallet.

37. The system of claim 32 further comprising at least one top guide rail connected to said rigid support framework in at least one of said storage lanes for limiting tipping motion of said articles within said storage lanes and at least one side guide rail connected to said rigid support framework in at least one of said storage lanes for limiting misalignment of said articles within said storage lanes.

38. The system of claim 32 further comprising at least one of said storage lanes including a gravity conveyor positioned to create a downward slope, said gravity conveyor including two outer roller rails and at least one inner roller rail for supporting and transferring said articles, said two outer roller rails including a plurality of rollers and said at least one inner roller rail including a plurality of rollers.

39. The system of claim 38 wherein said two outer roller rails further include tilt-in rollers wherein said tilt-in rollers are angled towards a longitudinal axis of said storage lane to create counteracting lateral forces on said articles to prevent misalignment of said articles.

40. The system of claim 38 wherein said two outer roller rails and at least one inner roller rail are spaced apart in a manner that facilitates the storage of at least one of the following:
   at least two twenty-four quart dairy cases stored side-by-side on said support rail set supported without an undergirding pallet;
   at least two sixteen quart cases stored side-by-side on said support rail set; and
   articles supported by a pallet conforming with the standards of the Grocery Manufacturers Association.

41. The system of claim 32 wherein the horizontal distance between said inner support rails ranges from 0.5 inches to 5.0 inches.

42. The system of claim 32 wherein said cleaning means includes a washdown pipe and a nozzle.

43. The system of claim 32 wherein the lateral distance between the inner support rails of each support rail set arranged beneath each article is between five and fifty percent of the lateral distance between one outer support rail and its respective inner support rail.

44. A compact automated storage system for receiving, storing and returning articles, comprising:
   a storage rack having a rigid support framework containing a plurality of open ended storage lanes having a cross sectional extent sufficient to allow the articles to be conveyed into and out of said storage lanes, said open ends of said storage lanes being generally positioned adjacent a shelving pathway extending along said storage rack;
   an article transporting means, movable within said shelving pathway, between loading/unloading stations in which said article transporting means is alignable with corresponding open ends of said storage lanes, said article transporting means including a plurality of shuttles for moving an article along a storage lane when said article transporting means is aligned with the open end of said storage lane and for vertically moving an article into and out of a stored position within said storage lane;

a plurality of support rail sets mounted on said support framework, respectively, within said plurality of open ended storage lanes, each said support rail set including a pair of outer support rails for providing vertical support to articles located in stored positions within the corresponding said storage lane and at least one pair of inner support rails for providing additional vertical support to said articles, said at least one pair of inner support rails being spaced, respectively, from said outer support rails by a distance sufficient to allow said shuttle means to pass therebetween when transporting an article along said storage lane, said at least one pair of inner support rails being spaced apart by a substantial horizontal distance to provide distributed support to articles stored directly on said plurality of support rail sets; and a bridge means extending between said inner support rails for providing a support platform for said articles stored thereon.

45. The system of claim 44 wherein said outer support rails and said inner support rails of said support rail set are spaced apart in a manner that facilitates the storage of at least one of the following:

at least two twenty-four quart dairy cases stored side-by-side on said support rail set supported without an undergirding pallet;

at least two sixteen quart cases stored side-by-side on said support rail set; and articles supported by a pallet conforming with the standards of the Grocery Manufacturers Association.

46. The system of claim 45 wherein said at least two sixteen quart cases are supported with an undergirding pallet.

47. The system of claim 44 wherein the horizontal distance between said inner support rails ranges from 0.5 inches to 5.0 inches.

48. The system of claim 44 wherein said outer support rails include an upper lip portion and a lower lip portion which extend inward towards said inner support rails.

49. The system of claim 48 wherein said outer support rails include an outer lip attachment that is rigidly attached to the upper portion of said outer support rails for preventing the articles from sliding and vibrating off of said support rail sets.

50. The system of claim 44 wherein said inner support rails include an upper lip portion and a lower lip portion which extend outward towards said outer support rails.

51. The system of claim 44 wherein said support rail sets comprise at least two troughs formed from galvanized steel in which said shuttle means is movable, said support rail sets having lip portions at its side edges for preventing the articles from sliding and vibrating off of said support rail sets.

52. The system of claim 51 wherein said automated storage system further includes a sprinkler means positioned adjacent to said outer support rails for spraying down said at least two troughs, said sprinkler means including a washdown pipe and nozzle.

53. The system of claim 44 wherein the lateral distance between the inner support rails of each support rail set arranged beneath each article is between five and fifty percent of the lateral distance between one outer support rail and its respective inner support rail.

* * * * *